US007853040B2

(12) United States Patent
Thorwirth

(10) Patent No.: US 7,853,040 B2
(45) Date of Patent: Dec. 14, 2010

(54) COVERT AND ROBUST MARK FOR MEDIA IDENTIFICATION

(75) Inventor: Niels Thorwirth, New York, NY (US)

(73) Assignee: Verimatrix, Inc., San Diego, CA (US)

( * ) Notice: Subject to any disclaimer, the term of this patent is extended or adjusted under 35 U.S.C. 154(b) by 0 days.

(21) Appl. No.: 12/240,582

(22) Filed: Sep. 29, 2008

(65) Prior Publication Data

US 2009/0087021 A1 Apr. 2, 2009

Related U.S. Application Data

(63) Continuation of application No. 11/489,754, filed on Jul. 19, 2006, now Pat. No. 7,430,302.

(60) Provisional application No. 60/700,472, filed on Jul. 19, 2005.

(51) Int. Cl.
*G06K 9/00* (2006.01)

(52) U.S. Cl. ...................................................... 382/100

(58) Field of Classification Search .................. 382/100
See application file for complete search history.

(56) References Cited

U.S. PATENT DOCUMENTS

| | | | |
|---|---|---|---|
| 5,530,759 | A | 6/1996 | Braudaway et al. |
| 5,748,783 | A | 5/1998 | Rhoads |
| 5,875,249 | A | 2/1999 | Mintzer et al. |
| 5,949,885 | A | 9/1999 | Leighton |
| 6,026,193 | A | 2/2000 | Rhoads |
| 6,049,627 | A | 4/2000 | Becker et al. |
| 6,154,571 | A | 11/2000 | Cox et al. |
| 6,389,152 | B2 | 5/2002 | Nakamura et al. |
| 6,430,302 | B2 | 8/2002 | Rhoads |

(Continued)

FOREIGN PATENT DOCUMENTS

| | | | |
|---|---|---|---|
| EP | 1120741 | A2 | 8/2001 |
| WO | WO2005/036459 | A1 | 4/2005 |

OTHER PUBLICATIONS

International Search Report for International Application No. PCT/US06/028116; International Filing Date Jul. 19, 2006; Report completed Sep. 27, 2007; mailed Oct. 22, 2007; 2 pgs.

(Continued)

*Primary Examiner*—Tom Y Lu
(74) *Attorney, Agent, or Firm*—Kauth, Pomeroy, Peck & Bailey LLP

(57) ABSTRACT

Systems and methods are described for repeatedly embedding information in media that is recoverable by emphasizing subtle variations between the media. In many embodiments perceptual models are used to identify portions of the media in which the embedded information is unlikely to be apparent to a human observer. One embodiment of the invention includes rendering the information in the form of a media, selecting a plurality of portions of media from the carrier media, combining at least part of the rendered media with each of the selected portions of the carrier media to form modified media portions, where the modifications to the modified media portions are not apparent to a human observer and creating a modified carrier medium using the modified media portions.

20 Claims, 17 Drawing Sheets

12
17
16
14
12
18
Network
12
20
10

U.S. PATENT DOCUMENTS

| | | | | |
|---|---|---|---|---|
| 6,584,210 | B1 * | 6/2003 | Taguchi et al. | 382/100 |
| 6,643,386 | B1 | 11/2003 | Foster | |
| 6,718,047 | B2 | 4/2004 | Rhoads | |
| 6,792,130 | B1 | 9/2004 | Jones et al. | |
| 6,940,993 | B2 | 9/2005 | Jones et al. | |
| 6,987,862 | B2 | 1/2006 | Rhoads | |
| 2003/0021439 | A1 | 1/2003 | Lubin et al. | |
| 2004/0230802 | A1 | 11/2004 | Moon | |
| 2004/0250079 | A1 | 12/2004 | Kalker et al. | |

OTHER PUBLICATIONS

Written Opinion for International Application PCT/US06/028116; Application filed Jul. 19, 2006; Completed Sep. 27, 2007; Mailed Oct. 22, 2007; 5 pgs.

European Supplementary Search Report for Application No. 06787922.1-1522, dated Jul. 23, 2008, 8 pgs.

Braudaway, "Protecting Publicly-Available Images with an Invisible Image Watermark", IEEE Signal Processing Society 1997, International Conference on Image Processing (ICIP'97), Santa Barbara, California Oct. 26-29, 1997, 4 pgs.

Chan et al., "A DWT-Based Digital Video Watermarking Scheme with Error Correcting Code", Proceedings Fifth International Conference on Information and Communications Security (ICICS 2003), 12 pgs.

Delaigle et al., "Human Visual System Features Enabling Watermarking", Proceedings of the IEEE, date unknown, 4 pgs.

Doerr et al, "A Guide Tour of Video Watermarking", Signal Processing: Image Communication, 2003, vol. 18, pp. 263-282.

Hsu et al, "Hidden Signatures in Images", ICIP '96, Sep. 96, 4 pgs.

Hsu et al., "Hidden Digital Watermarks in Images", IEEE Transactions on Image Processing, Jan. 1999, vol. 8, No. 1, pp. 1-21.

Johnson, "An Introduction to Watermark Recovery from Images", Proceedings of the SANS Intrusion Detection and Response Conference (IDR'99), San Diego, CA, Feb. 9-13, 1999, 6 pgs.

Lu et al, "Robust Adaptive Video Watermarking in the Spatial Domain", 5th International Symposium on Test and Measurement (ISTM 2003), Shenzhen, China, Jun. 1-5, 2003, pp. 1875-1880.

Niu et al., "A New Wavelet-Based Digital Watermarking for Video", IEEE Digital Signal Processing Workshop, Oct. 2000, pp. 1-6.

Niu et al., "Video Watermarking Resisting to Rotation, Scaling, and Translation", IEEE Digital Signal Processing Workshop, Oct. 2000, 8 pgs.

* cited by examiner

COVERT AND ROBUST MARK FOR MEDIA IDENTIFICATION

CROSS REFERENCE TO RELATED CASES

This application is a continuation application of U.S. application Ser. No. 11/489,754 filed Jul. 19, 2006 now U.S. Pat. No. 7,430,302 which application claims priority to U.S. Provisional Patent Application Ser. No. 60/700,472, filed Jul. 19, 2005, the entirety of which is incorporated herein by reference.

TECHNICAL FIELD

The invention relates generally to digital media, and more particularly to a secure, imperceptible, and robust Media Mark embedded in a carrier media, which can be rendered to a recognizable image in order to identify the carrier media.

BACKGROUND OF THE INVENTION

Digital representation, storage, distribution, and duplication of digital media have become very popular because they are inexpensive, easy to use, and maintain the quality of the media. These advantages however have enabled widespread, illegal distribution and use of copyrighted material, such as unauthorized distribution of digital images and videos over the Internet.

Many different approaches have been presented to secure digital media against unauthorized use. For example, digital encryption technology is effective to enable secure communication and delivery. However, if encrypted content is decrypted or presented in a form that is visible or audible to humans, the content can be rerecorded and an unsecured copy can be obtained.

Marking media by embedding recipient information in the media can help identify individuals that receive the media and use the content in an unauthorized manner. Further, embedded ownership information in the media can indicate copy restriction and clarify ownership of the media.

One way of marking media is by adding annotations to the digital media file format that can be read from the unmodified file and that are ignored during playback. This information can be lost, however, if the file is re-recorded or converted to another format.

To achieve a robust and permanent mark in video media, visible and overlay images that display copyright information during playback have been proposed. Overlaid images are robust against modification and easy to read. However, this approach can reduce the quality of the marked video, because the overlaid images interfere with the original video, which diminishes the quality of the viewing experience. In addition, overlaid images are obvious and are therefore easy to identify, and can be removed by overwriting or cropping.

Digital watermarking is another approach that has been suggested in several different variations. Many common digital watermarking schemes involve embedding a digital bit sequence in a digital media by introducing machine readable manipulations at certain positions in space or time. During readout, software is used to interpret these manipulations and to derive a digital bit sequence that is used to assemble the embedded message. In order to interpret the manipulations, knowledge of the positions of the manipulations in space or time is required. When the manipulations are distorted (i.e., misplaced or weakened, for example), the readout (also referred to as detection) often becomes difficult or impossible. Distortions can occur during simple media treatment such as cropping, rotation, conversion to another file format, and modification of the frame rate. Further, intentional misplacement of the manipulations can be applied by an attacker in order to remove the mark, and can be achieved through imperceptible, slight, combined distortions, such as shifts, rotation, and variations in playback speed. Publicly available tools apply some of these manipulations, also called attacks, in an automated fashion. Current digital watermarking algorithms are often not powerful enough to recognize misplacements in distorted content (a process also called registration). As a result, intentional misplacement can render the digital watermark unreadable.

Machine readable manipulations are also vulnerable to another security risk, which is described below. Detection of machine readable manipulations typically requires knowledge of the manipulations that have been performed. Therefore, someone attempting to circumvent a watermark can ascertain location and meaning of the manipulations by observing the watermark being read or embedded. The observation can be performed by analyzing, or reverse engineering, the embedding or detection process. Subsequently, the manipulations can be removed or inverted by a skilled attacker, effectively removing the watermark. In addition to removal of the watermark, the reverse engineering approach described above enables modification of the information embedded in the watermark. This is true, even if the positions of the manipulations are encrypted with a secret key. The protection offered by the use of a secrete key is limited, because the same key is typically used for embedding and detection. An attacker can analyze or reverse engineer the embedding or detection application and gain access to the locations, even if they are encrypted. Furthermore the secret key can be observed by analyzing the detection or embedding application.

In addition to registration and security, robustness against lossy compression and filtering is an important component of imperceptible marking of multi-media content. During watermarking, a message is typically embedded in digital media by manipulating areas of the digital media that are suited for hiding machine-readable information and do not significantly contribute to the human perception of the marked content. Examples of such areas in the digital media include areas that include fine details (i.e., high frequencies). These areas however, can be altered or removed while the content maintains an acceptable quality. For example, common lossy compression schemes like MPEG2 and H.264 remove this perceptually insignificant information in order to reduce the size of a digital media file and thereby remove watermark information stored there. Therefore, compression of the media using such a lossy compression scheme can result in the removal of some or all of the watermark information.

Digital still images have been the early focus of watermarking research. Video watermark approaches are typically based on the application of a still image watermark to each video frame. The reason is that the application of the still image watermark to each video frame is obvious and easy to implement. However, this approach does not efficiently use the time domain for gathering embedded information. Detection of the watermark is typically only successful if some information from the individual frames can be recovered. This approach often fails if the watermark cannot be read in any frame due to a failure in registration or destruction of relevant areas of the video frames. Furthermore, if frames are watermarked as individual images and the watermarks vary between frames, the watermarks are susceptible to an attack because similar frames within one video can be averaged together in order to weaken the watermark. If each of the frames contains an identical watermark, the frames can be used to analyze the structure of the watermark that is in each of the frames to understand and subsequently remove the watermark.

Furthermore, the process of digital watermarking typically involves a complex transformation of the original image and of the message to be embedded. Examples of such complex transformations are DCT, Fast Fourier, or Wavelet transformations. The required calculations to perform these transformations are time intensive processes, which can be a significant limitation when embedding a digital watermark in real-time (e.g., during playback or download). Furthermore, watermarking approaches typically consist of clearly defined modifications, allowing little flexibility for variations in order to adopt different compression formats, security, or performance requirements.

SUMMARY OF THE INVENTION

The invention relates generally to digital and analog media, and more particularly to systems and processes for repeatedly embedding information in carrier media, which can be uncovered in order to identify the carrier media.

One embodiment of the invention includes rendering the information in the form of a media, selecting a plurality of portions of media from the carrier media, combining at least part of the rendered media with each of the selected portions of the carrier media to form modified media portions, where the modifications to the modified media portions are not apparent to a human observer and creating a modified carrier medium using the modified media portions.

In a further embodiment, the carrier media includes a video sequence, each of the portions of carrier media is a single video frame and the rendered media is an image.

Another embodiment also includes varying the geometry of the image representing the rendered media.

In a further embodiment again, combining parts of the rendered media with each of the portions of the carrier media includes modifying the rendered media according to a perceptual model.

In another embodiment again, the portions of the rendered media combined with portions of the carrier media are selected pseudo randomly.

In a still further embodiment, the carrier media includes an audio sequence, each of the portions of carrier media is a section of audio and the rendered media is an audio sequence.

In still another embodiment, the carrier media includes video and the rendered media includes a lens through which video can be projected or recorded.

In a yet further embodiment, the information includes metadata related to the media.

In yet another embodiment, the information identifies the time and location of video playback.

In an additional further embodiment, the information identifies the copyright owner or recipient of the media.

In another additional embodiment, the information includes a reference to a database.

A still further embodiment again, includes selecting a plurality of portions of media from the carrier media, selecting at least part of each of the portions of media, emphasizing the parts from the portions of media and combining the parts from the portions of media.

In still another embodiment again, emphasizing parts of the portions of media includes applying a high pass filter to each portion of media.

In a yet further embodiment again, emphasizing parts of the portions of media includes subtracting the carrier media excluding the embedded media from the carrier media including the embedded media.

In yet another embodiment again, the carrier media includes a video sequence, the embedded media includes a digital image, each portion of media is a video frame, and the part of each video frame that is emphasized includes a group of pixels.

In a further additional embodiment again, combining together each part of the portions of media includes averaging together each part of the portions of media.

In another additional embodiment again, the embedded media is recognized by a device after the combination of the parts of the portions of media.

In another further embodiment, the carrier media includes an audio sequence, the embedded media includes an audio sequence, each of the portions of audio comprise a portion of the audio sequence and the part of each of the portions of the audio sequence includes a group of audio samples.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Turning now to the drawings, systems and methods for embedding and uncovering Media Marks in accordance with embodiments of the present invention are shown. In many embodiments, the Media Marks are in the form of information that is repeatedly embedded in a media sequence or collection of media and the embedded information is typically not perceptible to a human viewer. However, the information constituting the Media Mark is recoverable and once recovered is typically designed to be intelligible by humans. In a number of embodiments, the Media Mark is uncovered by emphasizing and combining information from selected portions of media in the media sequence or collection of media. In embodiments where the Media Mark is repeatedly embedded in the media, combining information from multiple portions of the media amplifies the mark relative to the underlying media information. By repeatedly embedding the mark in the media, the Media Mark is difficult to remove by manipulation of the media. In addition, embedding a Media Mark in the media sequence enables the media sequence or collection of media to retain the Media Mark after quality degradation such as caused by reformatting or recording.

The processes of embedding and uncovering Media Marks in accordance with embodiments of the present invention are asymmetric. The embedding and uncovering processes are different processes, implemented with different algorithms. The information that is required, or acquired, when uncovering the Media Mark is not sufficient to remove the Media Mark from the media. Furthermore, the embedding and uncovering processes are typically performed by a computer but the actual recognition and interpretation is typically performed by a human.

In embodiments where the media sequence is a sequence of video frames, the Media Mark can take the form of visual information that is repeatedly combined with image information from the frames of the video sequence. In many embodiments, a perceptual mask is used to combine the visual information and image information of a video frame in a way that reduces the likelihood that a human viewer will perceive the presence of the visual information in the rendered video frame.

In other embodiments, the Media Mark is audio information that is periodically embedded in an audio sequence or visual information that is embedded within a similar location in a collection of images. The Media Mark can be digital information inserted in digital media or inserted using analog processes. Media Marks in accordance with embodiments of the present invention can be used to identify a recipient of a media, track distribution of a particular media sequence or collection of media. In addition, Media Marks can be used to embed archival information into media, to perform copy control, to perform broadcast monitoring and/or to distribute secret communications.

Systems for Embedding Media Marks

Figure 1:
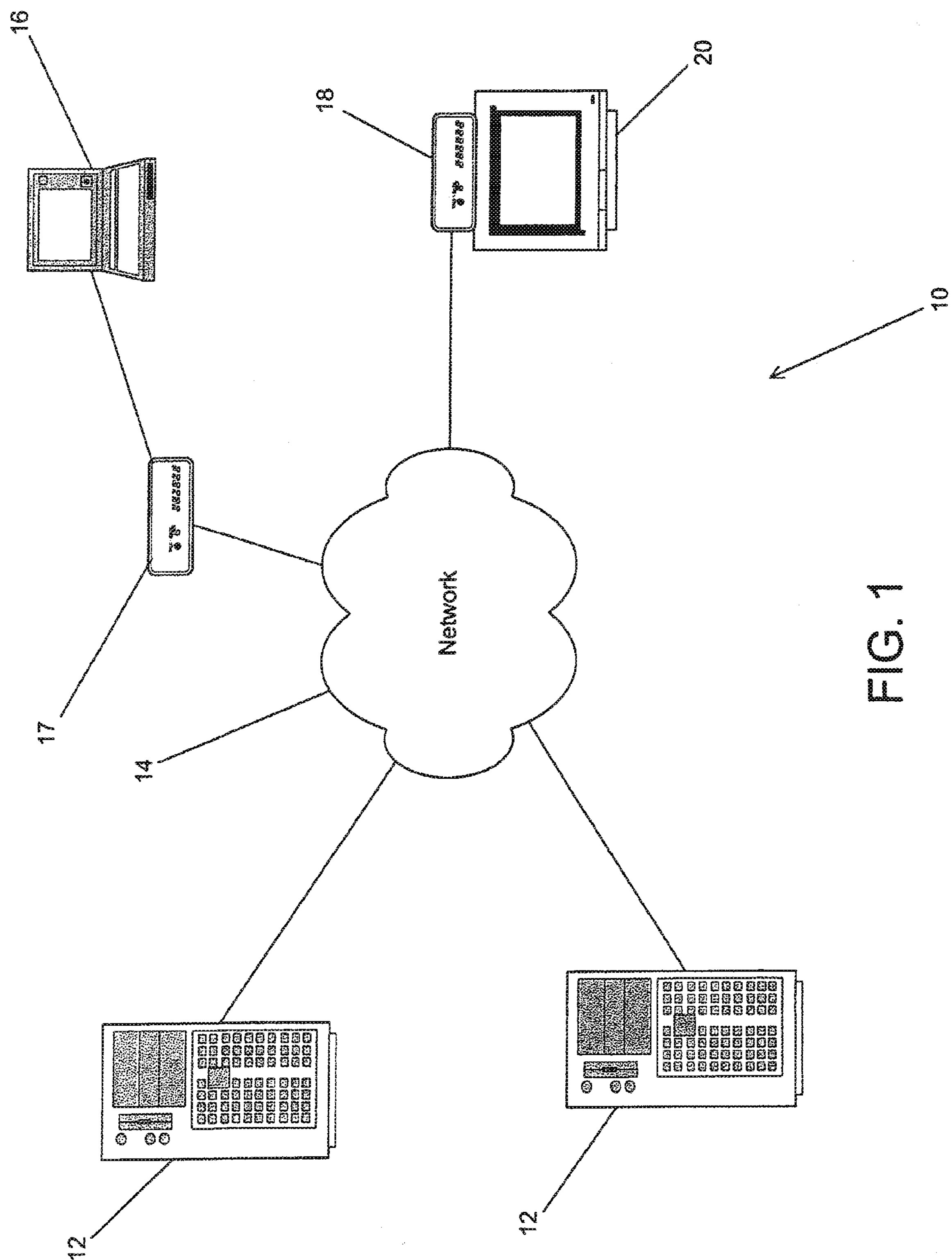
FIG. 1 is a schematic diagram showing a media distribution system in accordance with an embodiment of the invention.

An embodiment of a system in accordance with the present invention for distributing media is shown in FIG. 1. The system 10 includes a number of servers 12 that are connected to a plurality of devices via a network 14. In the illustrated embodiment, the network is a cable television network and one of the devices connected to the network is a computer 16 that is connected to the network via a cable modem 17. Another device that is connected to the network is a cable box 18 that provides an output to a television 20.

The servers 12 store media that can be provided to devices connected to the network. In many embodiments, the transfer of media between the servers and the devices is secured using encryption. The media is typically compressed to reduce the amount of data required to be transmitted. Encrypted media received from the servers is typically decrypted and decompressed for rendering and part of the decryption and decompression process includes embedding a Media Mark in the decrypted and decompressed media. In the case of media received by a consumer electronics device such as a cable box 18, the decryption and embedding processes are often performed in hardware. When the device receiving the encrypted media software is configurable (e.g., the computer 16), the decryption, decompression and/or embedding of a Media Mark in the media can be performed either in hardware or using client software. Once a Media Mark is embedded in the decrypted and decompressed media, the Media Mark will be present in the media if the media is copied or transferred. In many embodiments, the Media Mark is unique to the device that received and decrypted the media. In a number of embodiments, the Media Mark includes information concerning the date and time on which the content was received and an identification for the receiving device or user. The information to be embedded such as the date, time and identification can originate from the server and can be delivered along with the media or the device can use information stored locally such as its serial number and date and time from its internal clock. In embodiments where the encrypted media is compressed, the Media Mark can be embedded into the media prior to or following decompression. Techniques for embedding Media Marks are discussed further below.

Although the embodiment shown in FIG. 1 includes a cable television network, other embodiments of the invention can include other networking technologies to enable communication between the servers and the devices connected to the network. In addition, devices in accordance with embodiments of the invention that can receive media and embed Media Marks are not limited to cable boxes and computers. Any of a variety of connected and unconnected consumer electronics devices and computing devices can embed Media Marks in accordance with embodiments of the invention.

The embodiment shown in FIG. 1 involves distribution of media via a network and the embedding of the Media Mark following distribution. Many embodiments of the present invention involve embedding Media Marks in media prior to the distribution of the media. In a number of embodiments, a Media Mark is embedded in the media by the server (i.e., at the head-end). When a Media Mark is embedded by the server or the information to be embedded is determined by a server, the server can record information concerning the embedded Media Mark. For example, the server can store information concerning the requester's billing information and/or information concerning the receiving device as well as a communication protocol about the media and information transmitted. In many embodiments, multiple Media Marks are embedded in media either at the same time or at different stages in the distribution or processing of the media. Each distribution or processing step that adds an individual mark can be traced from the uncovered mark. In addition, the process of embedding Media Marks in accordance with embodiments of the inventions is compatible with most conventional watermarking technologies, in that Media Mark can co-exist with conventional watermarking technologies in the same media without significant interference. Therefore, embodiments of the present invention can be used to embed Media Marks in watermarked media or to apply a watermark to media containing a Media Mark.

Figure 2:
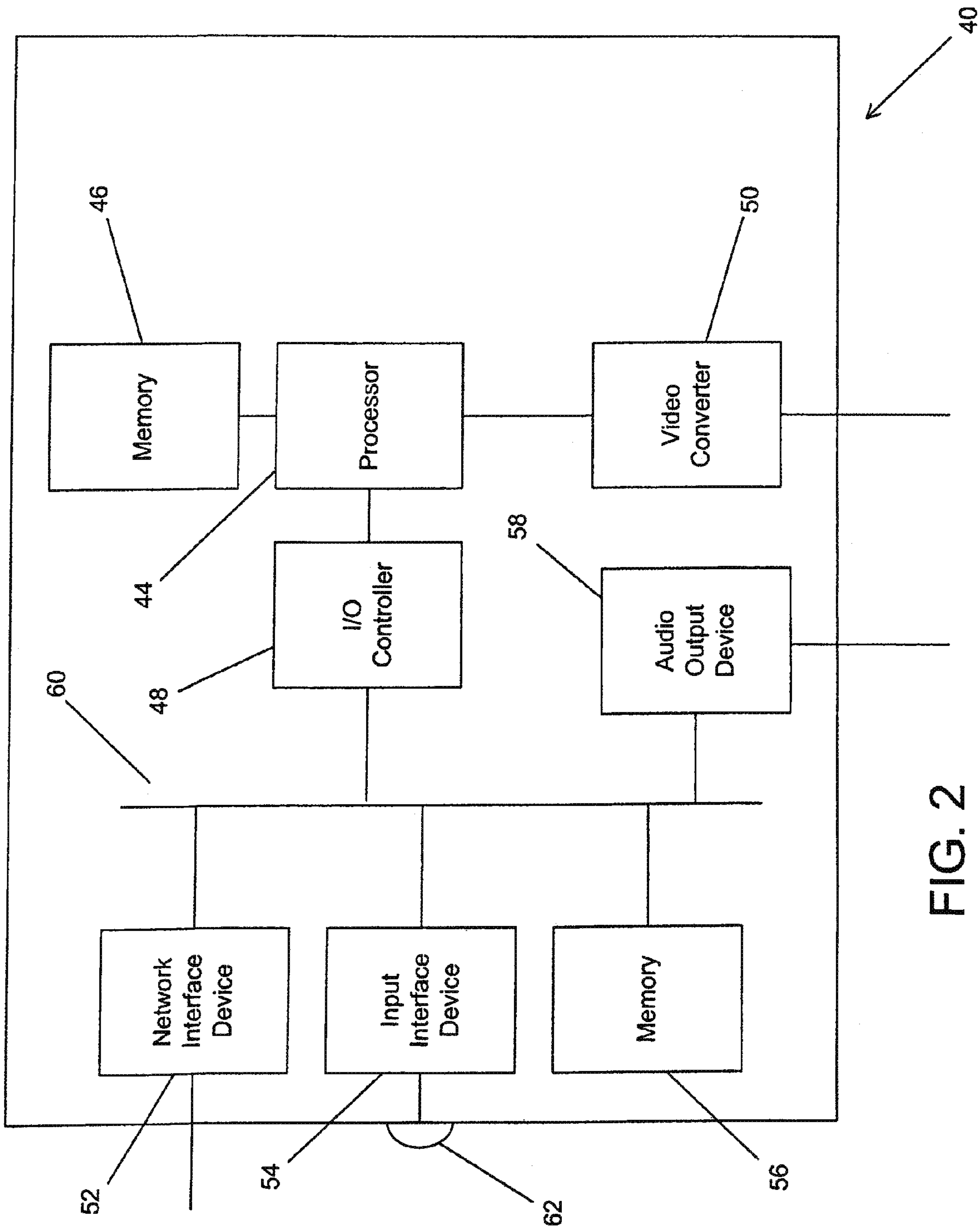
FIG. 2 is a schematic diagram showing a consumer electronics device configured to embed Media Marks in video sequences and/or audio sequences in accordance with an embodiment of the invention.

An embodiment of a consumer electronics device capable of embedding a Media Mark in media in accordance with an embodiment of the invention is shown in FIG. 2. The consumer electronics device 40 includes a processor 44 that is connected to memory 46, an I/O controller 48 and a video converter 50. The I/O controller 48 is connected to a network interface device 52, an input interface device 54, additional memory 56 and an audio output device 58. In the illustrated embodiment, the network interface device 52 is connected to a network and media is received via the network. The received media is manipulated by the processor for rendering. As discussed above, one of the manipulations that can be performed by the processor is to embed a Media Mark in the media. The processor can be in the form of a microprocessor configured using firmware or software. Alternatively, the processor can be implemented as part of a digital signal processing circuit or as an application specific integrated circuit. In many embodiments, a combination of a microprocessor and other circuitry is used to implement the processor. Although a specific architecture is shown in FIG. 2, embodiments of the invention can take the form of any variety of consumer electronics, embedded devices and computing devices. For example, embodiments of the invention can include VHS tape players, DVD players, video projectors, cameras, digital videocamcorders, personal computers that process media data, hand held videoplayback devices (including cell phones and game machines), and personal organizers that can process video.

Embedding Media Marks

Figure 3:
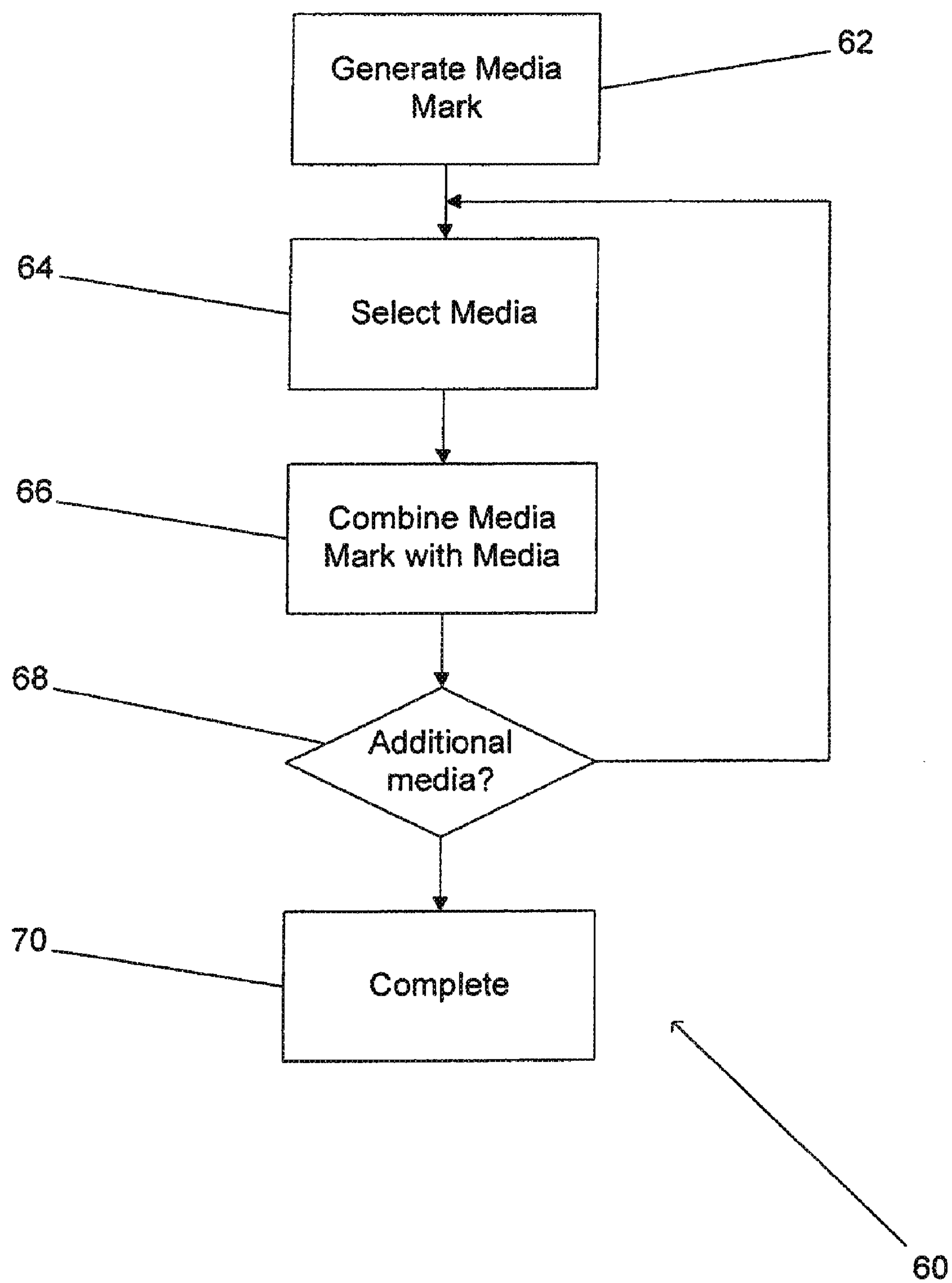
FIG. 3 is a flow chart showing a process for embedding a Media Mark in media in accordance with an embodiment of the invention.

The above discussion includes description of systems that are capable of embedding Media Marks in media in accordance with embodiments of the invention. A process that can be used to embed a Media Mark in media in accordance with an embodiment of the present invention is shown in FIG. 3. The process 60 involves generating a Media Mark (62) and then selecting (64) portions of media in which to embed the mark. The Media Mark is then combined (66) with the portions of media to form a modified media portion in which the mark is embedded. A decision (68) is then made concerning whether any additional media is available in which to embed the mark. If there is additional media, then another portion of media is selected and the Media Mark combined with the portion of media until there is no additional media. Once there is no additional media, the process is completed (70) by recombining the multiple portions of media. In many embodiments, recombination is unnecessary as the Media Mark is combined with portions of media as the portions of media are played.

In the process outlined above, the media in which the Media Mark is embedded can be part of a media sequence or a collection of media. As will be described in greater detail below, the Media Mark need not be combined with each of the portions of media in the media sequence or collection of media. When the Media Mark is only combined with some of the portions of media, then the modified portions of media are combined with the unmodified portions of the media to create media in which the Media Mark is embedded. The following discussion addresses in greater detail aspects of the process outlined above.

Generating a Media Mark

As discussed above, Media Marks in accordance with embodiments of the invention typically take the form of information represented in a human intelligible form. For example, a Media Mark that is to be embedded in a video sequence or collection of images can include letters and/or images. The information can also be represented by a specific size, shape, texture, font type or location of symbols. A Media Mark that is to be embedded in an audio sequence can include sounds, a melody or spoken words. In a number of embodiments, the Media Mark can also include machine intelligible information such as bar codes or OCR fonts.

The information that can be included in a Media Mark is almost limitless in its variety. In many embodiments, the Media Mark includes information concerning the recipient, owner and/or time and location of transmission or display. Media marks can also include such information as hash codes of a large amount of information and/or an index to other information (such as a database record). In a number of embodiments, the Media Mark includes information concerning distribution or processing restrictions that indicate the allowed workflow, modifications to the media, allowed number of copies, or allowed recipients of a copy of the media file.

Generating Media Marks for Use in Video Sequences or Image Collections

Figure 4:
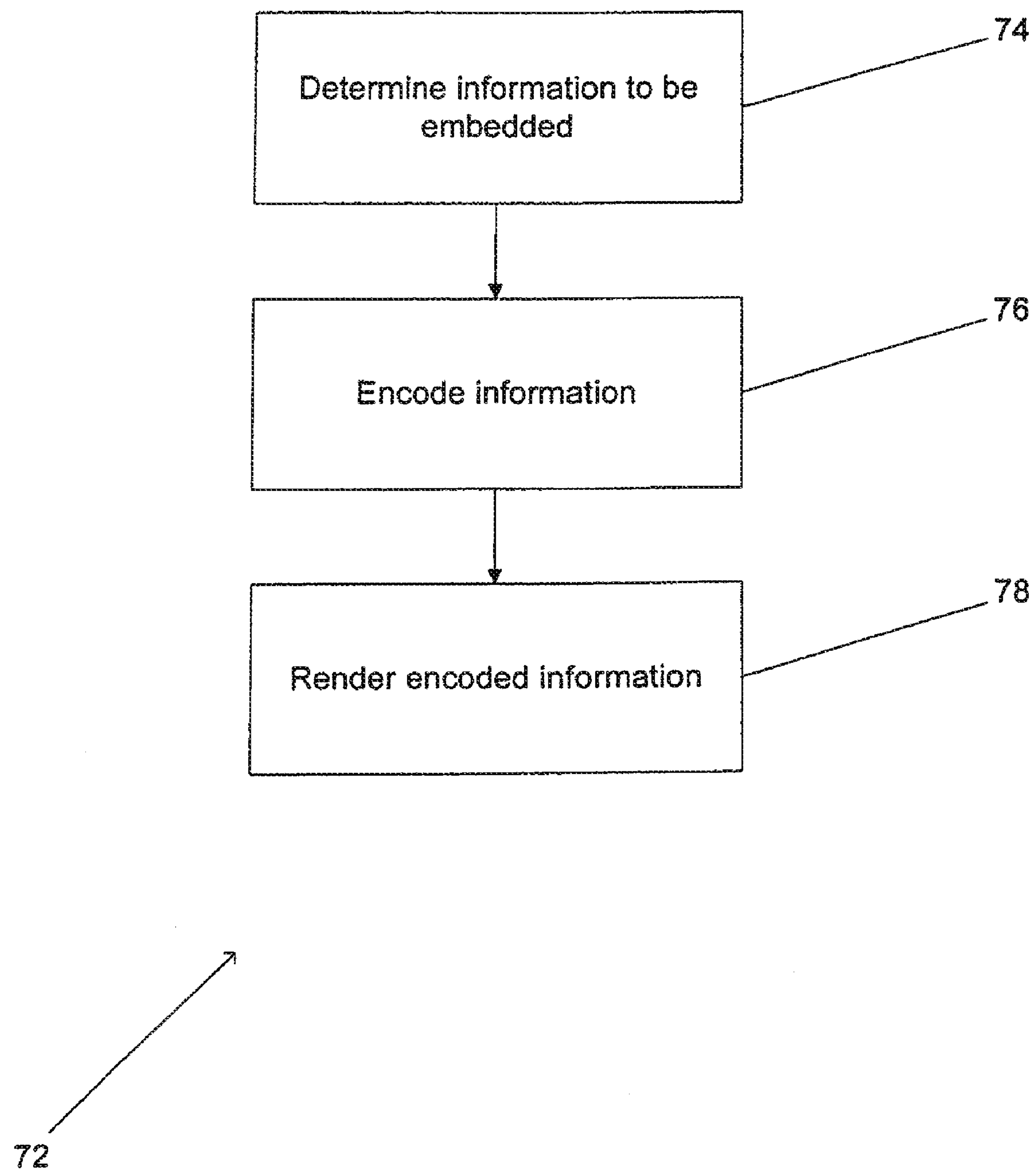
FIG. 4 is a flow chart showing a process for generating a Media Mark that can be embedded in a video sequence or collection of images in accordance with an embodiment of the invention.

A process for generating a Media Mark that can be embedded in a video sequence or a collection of images is shown in FIG. 4. The process 72 includes determining (74) the information to be embedded, encoding (76) the information and rendering (78) the encoded information.

As discussed above the information that can be embedded in a Media Mark is virtually limitless. The information can be human intelligible and/or machine intelligible. Once the information to be embedded has been determined the information is encoded. The information can simply be encoded as a series of alphanumeric symbols that are then rendered. In other embodiments, the basic information is modified prior to rendering. In many embodiments, the information can be compressed, supplemented with error identification or correction information and/or encrypted. The rendering process involves generating media using the encoded information. In the case of a Media Mark that is to be embedded in a video sequence or image collection, the encoded information is rendered as an image. In the case of a Media Mark that is to be embedded in an audio sequence, the encoded information is converted to an audio sequence.

Encoding Information for Rendering as a Media Mark

Encoding information in accordance with embodiments of the present invention involves determining the manner in which the information contained within a Media Mark is to be represented. As discussed above, Media Marks embedded in a video sequence or collection of images can include letters and/or images and Media Marks embedded in an audio sequence can include sounds, a melody or spoken words.

In a number of embodiments, the information is represented using large symbols and/or a simple font such as Arial (e.g., approximately ¼ the height of a video frame). The large symbols have few fine details and are therefore mostly comprised of relatively low frequency components. Low frequency components are very robust and remain within the video after the video has been degraded through various processes, such as compression, re-recording, and filtering. The symbols can further be chosen in such a way that they are familiar to humans for easy recognition, such as symbols from the alphabet, least visible when embedded, such as vertical and round lines rather than horizontal or vertical straight lines, for example, or that have a maximum difference between each other, such as a vertical and horizontal bar. Another consideration when choosing symbols to represent the embedded information are the efficiency in which they can be applied by a machine, such as blocks that can be efficiently stored and applied.

In a number of embodiments, information is represented by the location of symbols. The frame size is logically divided into several different regions and information is coded by enabling or disabling a symbol in a region. In many embodiments, the presence or absence of a symbol in a specific location is used to encode binary information. In several embodiments, information of the same category is stored in identical locations such that marked videos that are averaged to remove the Media Mark maintain common information in each category. The information is further built in a hierarchical way to have significant values at identical positions. For example, if several movies that contain different time-codes but the same zip code are averaged, the zip code information will not be weakened by the averaging procedure. If copies from different regions are averaged then the first digits are maintained from zip codes that are close to each other and do not differ by a large value.

In other embodiments the location of the mark is selected from several disjoint areas, such that marked videos that are averaged together possibly contain several readable marks without overlap.

A group of embodiments encode information to provide a fixed symbol at a fixed location in order to identify that a movie has been marked. Were someone to attempt to remove an embedded Media Mark by combining frames from a number of different copies of the media, information in the Media Marks that is not present in all of the copies of the media can be weakened. However, the common information (i.e., fixed symbols in fixed locations) contained in the Media Mark of each copy can be uncovered.

Figure 5:
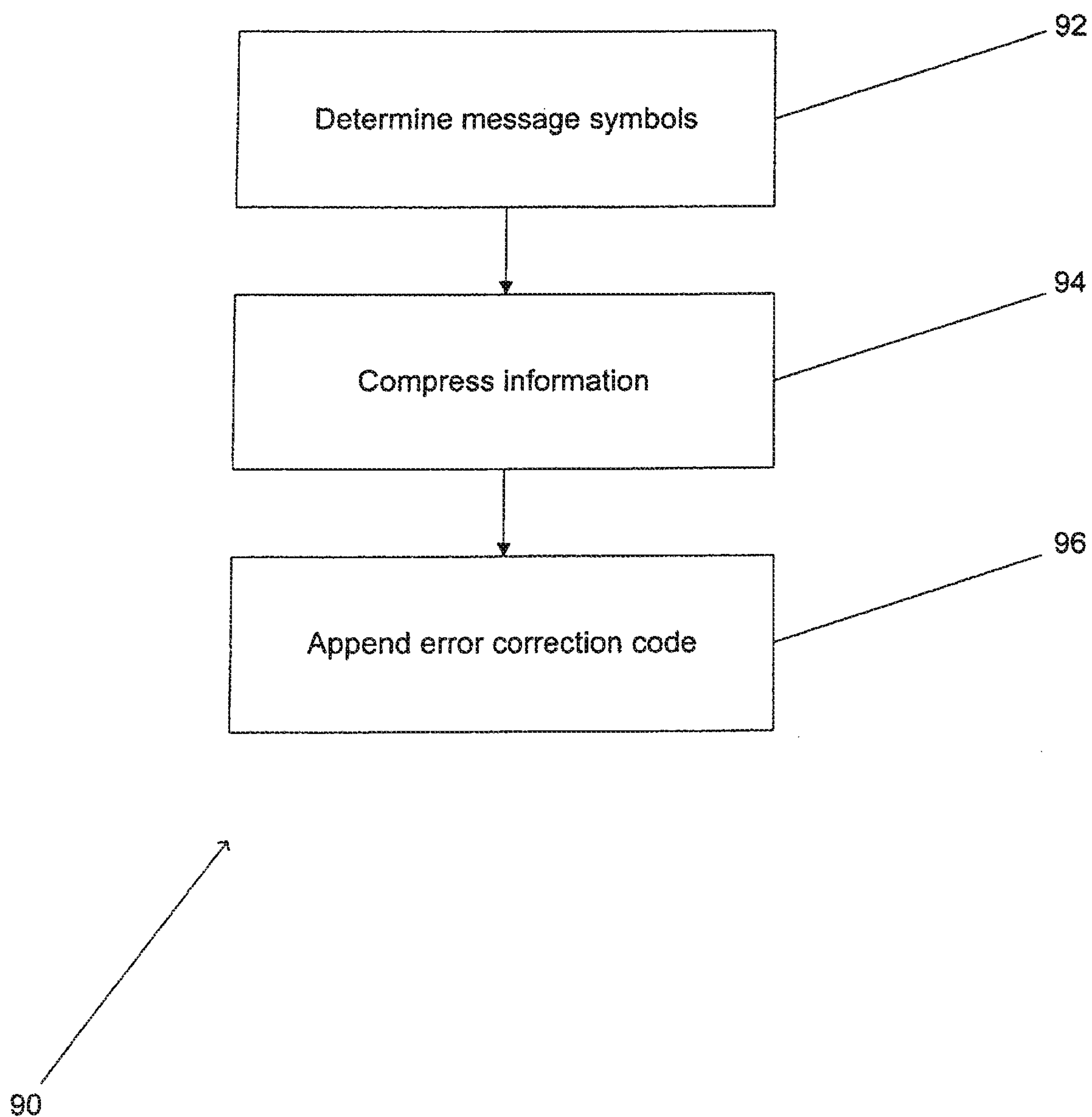
FIG. 5 is a flow chart showing a process for encoding information that is used in a Media Mark in accordance with an embodiment of the invention.

In addition to the representation of information, the encoding process can involve additional processes designed to compress or secure the information contained within the Media Mark and processes designed to correct errors introduced into the information by subsequent processing of the media. A process for encoding information that involves compression and embedding of error correction code in accordance with an embodiment of the invention is shown in FIG. 5. The process 90 includes providing information (92) that is then compressed (94) and following compression is processed to generate error correction information, which is appended (96) to the compressed information. The additional information for error correction adds redundancies that can be used to correct potential misreads and restore missing or unrecognizable symbols during recognition of the uncovered Media Mark.

Figure 6:
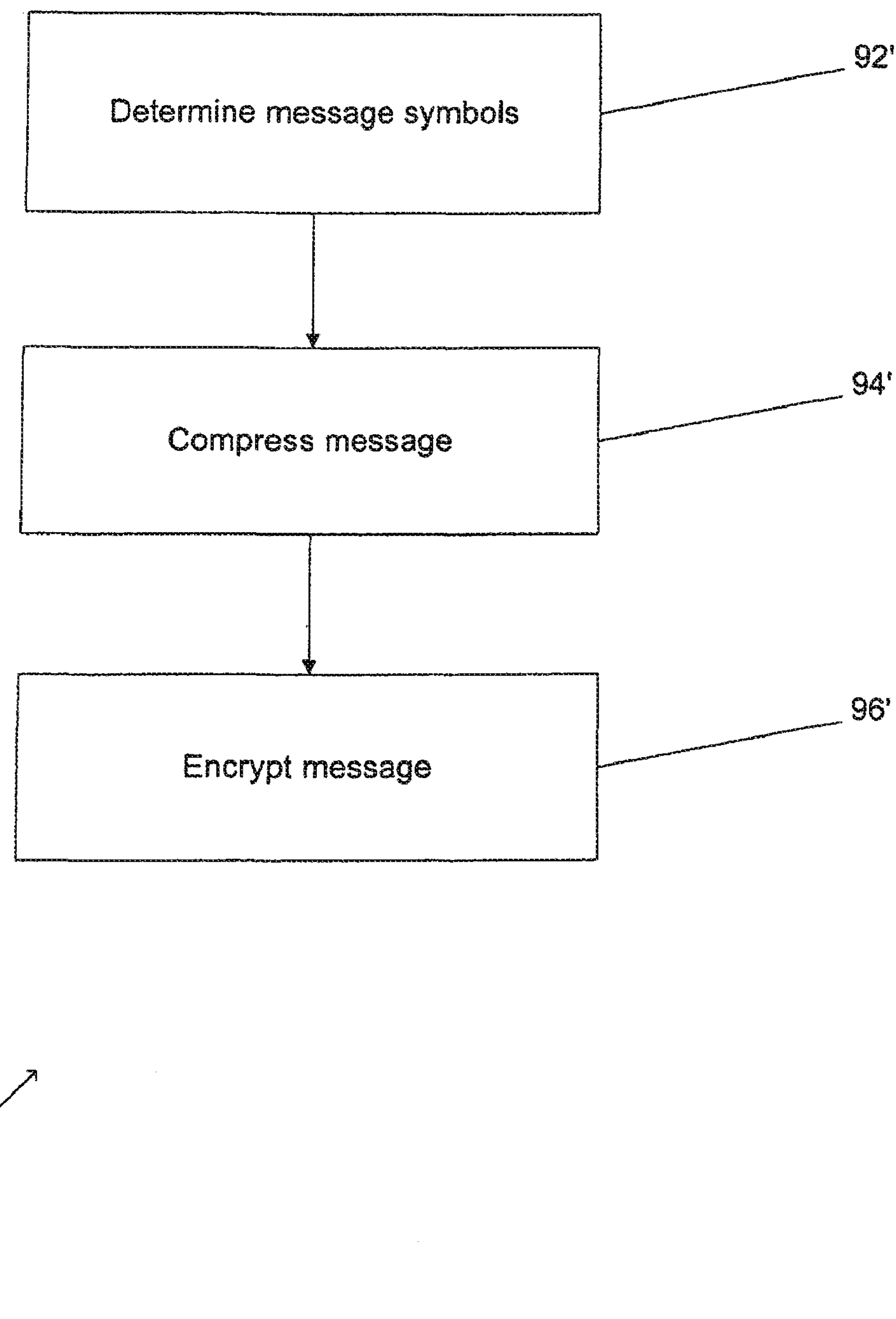
FIG. 6 is a flow chart showing a process for encoding information that is used in a Media Mark in accordance with another embodiment of the invention.

Any of a variety of processes can be applied when encoding information to form a Media Mark. Another process for encoding information that involves encryption in accordance with an embodiment of the invention is shown in FIG. 6. The process 90' involves providing (92') information that is then compressed (94') and encrypted (96'). Encrypting information included in a Media Mark enables the secure transmission of information within media. In many embodiments, Media Marks that include encrypted information (either in a video or audio format) can be used to send secret messages within media. As is evident from the discussion above, any of a variety of different encoding techniques and processes can be used to encode information prior to rendering as a Media Mark. The nature of the encoding processes typically depends upon the information that is stored in the media, the later use of this information and expected degradation of the information as well as availability of information to be correlated with the information stored in the mark.

Rendering Encoded Information to Form a Media Mark

Once the information desired to be within a Media Mark is encoded, a Media Mark in accordance with embodiments of the invention can be created by rendering the encoded information as media. In the case of a Media Mark for embedding in a video sequence or collection of images, the encoded information is typically rendered as an image and in the case of a Media Mark for embedding in an audio sequence, the encoded information is typically rendered as an audio sequence.

In embodiments where information encoded as symbols is to be embedded in a video sequence or collection of images, the symbols can be rendered into an image, such that the symbols have color and luminance information different from the background. In a number of embodiments, the background of the image that will form the Media Mark is a medium gray. The areas with the medium gray background color typically will not modify the video frames after embedding the Media Mark. In several embodiments, symbols are rendered as having dark content with a light border to provide a strong contrast at the outline of the symbols. In many embodiments, the lightest and darkest areas vary by approximately 8% from the medium gray. For an eight bit gray image, pixel values range from 0 to 255. Medium gray has a pixel value of 127 and the minimum and maximum pixel values are about 107 and 147 respectively. In addition, the perceptually important areas used to recognize a character can be emphasized with a stronger mark such that the end points of each character line are made darker in order to achieve stronger embedding. The stronger embedding can provide better readability in the uncovered Media Mark even if the content is degraded.

Figure 7:
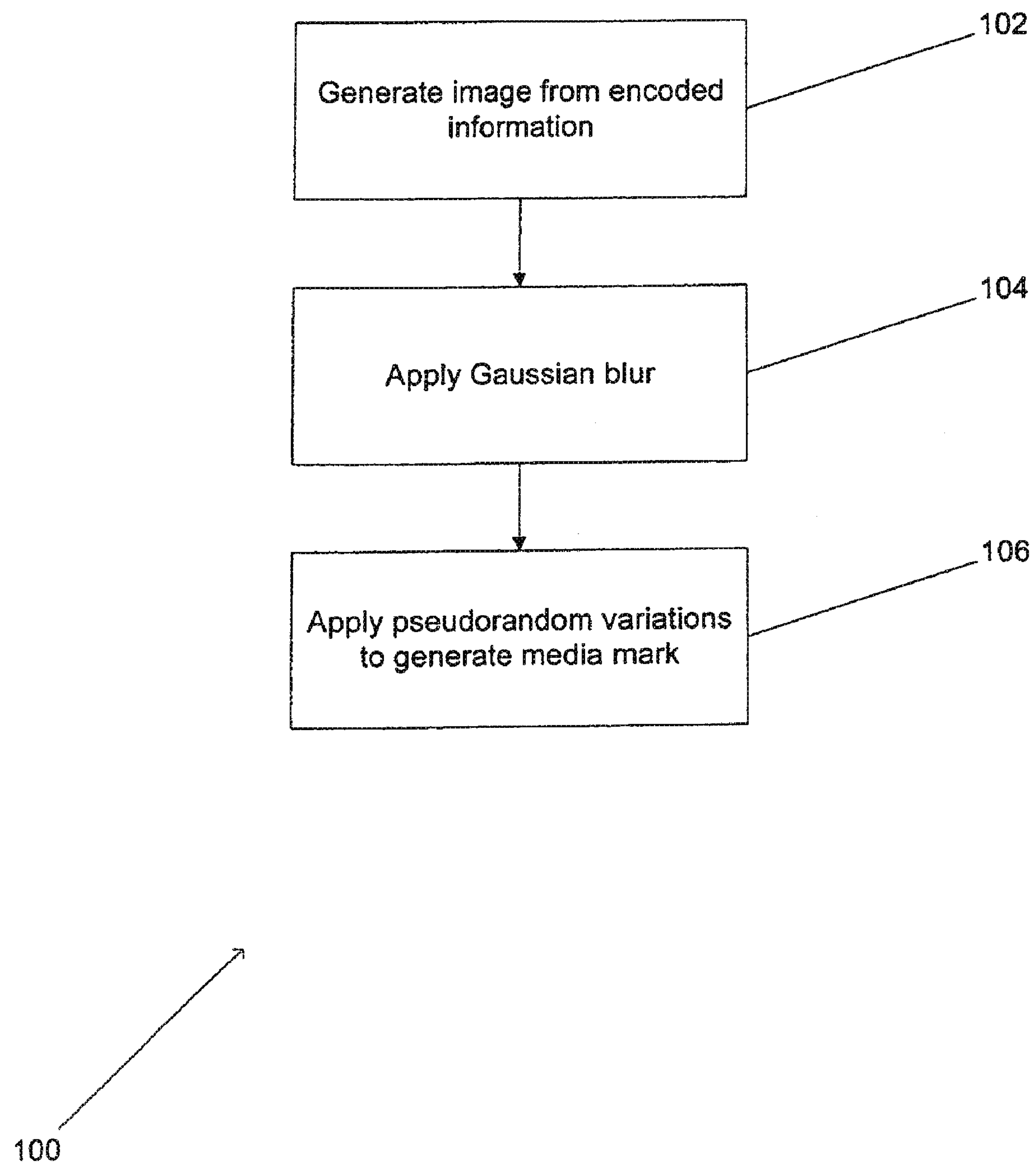
FIG. 7 is a flow chart showing a process for rendering a Media Mark in accordance with an embodiment of the invention.

As part of the process of rendering a Media Mark in accordance with embodiments of the invention, a variety of filters and/or transformations can be applied following the generation of an image. The variations resulting from the filters and transformations typically do not prevent human recognition of the uncovered Media Mark. The variations can, however, complicate detection of the location of a Media Mark using a machine resulting in an improved protection against automated recognition. A process for rendering a Media Mark for embedding in a video sequence or collection of images in accordance with an embodiment of the invention is shown in FIG. 7. The process 100 includes generating (102) an image using the encoded information and applying (104) a filter to the generated image. In the illustrated embodiment, the filter is a Gaussian blur with a sigma of approximately 0.5 and a standard deviation of approximately 0.5. Applying the Gaussian blur can remove strong edges, which may be visible in the marked content. Following the application of a filter, the image is transformed (106). In the illustrated embodiment, the transformation involves applying pseudo random geometric variations to the image. For example, a rotation between −5 and +5 degree, a position shift between −10% and +10% of the image size, and a stretch between +10% and −10% in horizontal and vertical direction are applied. Although in other embodiments other pseudo random variations can be applied.

In a number of embodiments, the application of pseudo random variations relies on the use of a secret encryption key to generate a pseudo random sequence from which the parameters for the variations can be derived. The encryption key can be supplied by the user or generated randomly. When pseudo random variations are applied in the manner outlined above to generate a Media Mark, the Media Mark cannot be perfectly removed from media in which it is embedded without knowledge of the encryption key. Therefore, many embodiments of systems in accordance with the present invention store the encryption key to enable use of the encryption key to remove the Media Mark from media in which the Media Mark is embedded. If the Media Mark is not to be removed, the key can be discarded after the Media Mark is embedded because it is not required for detection.

In addition to the filters and transformations described above with reference to FIG. 7, embodiments of the invention can utilize any of a variety of filters, transformations or data manipulation processes in the rendering of a Media Mark. For example, the rendering of a Media Mark for embedding in a video sequence or collection of images can include modification of texture, font type, or symbol shape. Typically, the processing performed with respect to the basic rendered media is determined based upon the requirements of the specific application for which the Media Mark is being used.

Figure 8:
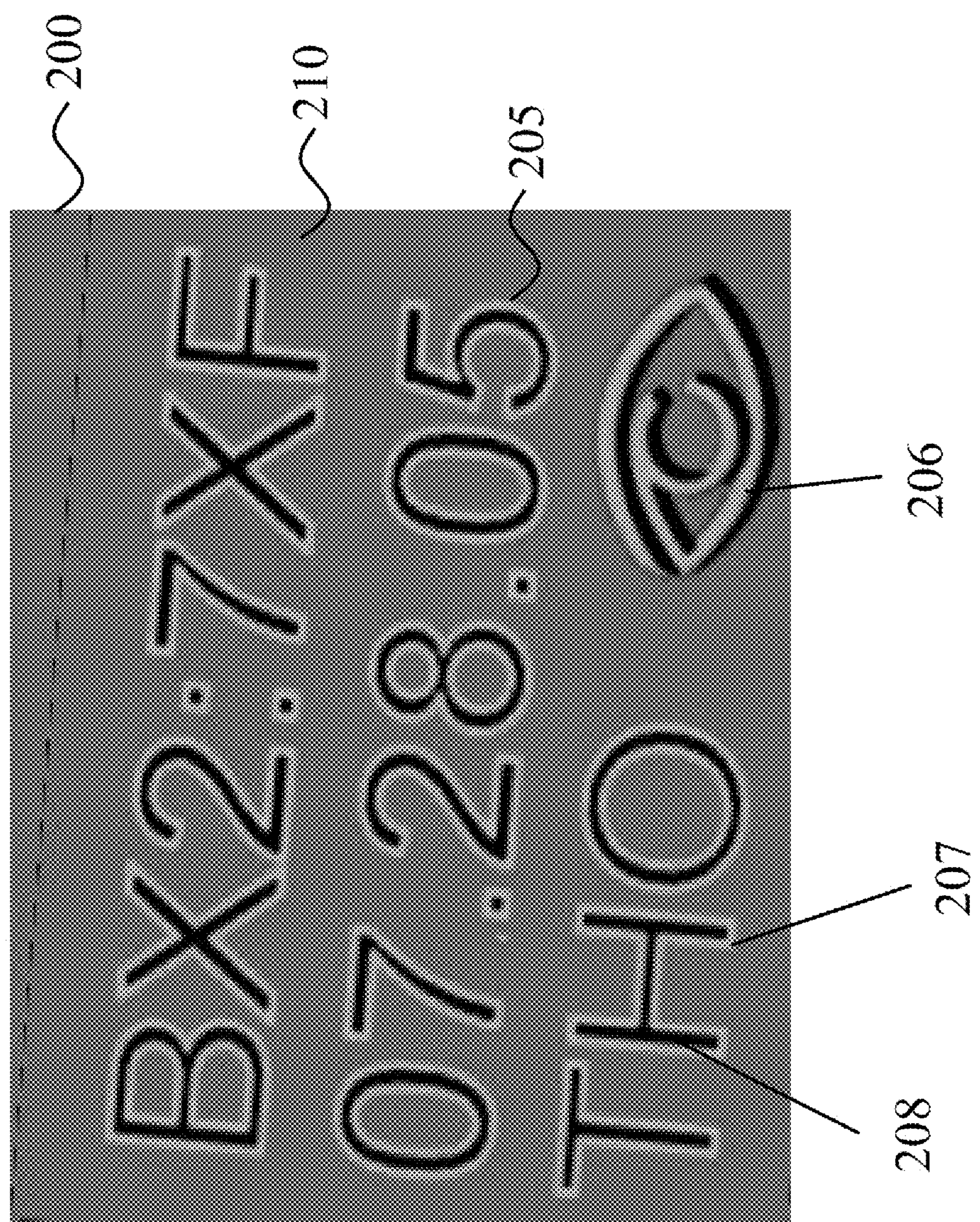
FIG. 8 is an example of a Media Mark of textual information rendered to an image with geometric variations applied in accordance with an embodiment of the invention.

A rendered Media Mark in accordance with an embodiment of the invention is shown in FIG. 8. The Media Mark 210 includes textual information 205 and graphics 206 that is rendered to an image 200 with geometric variations applied. In the illustrated embodiment, the textual information 205 and the graphics 206 are rendered with light border regions 207 and dark interior regions 208. At least one of the geometric variations applied to the image is the partial rotation of the image so that the lines of text information do not run parallel to the edge of the image. In other embodiments, text and graphics can be rendered using a single color or different combinations of regions. In addition, various other filters, transformations and/or processes can be used to create other variations in the image (see description above). Furthermore, filters or fonts can be used that break up lines in the Media Mark and a pseudo random noise pattern can be applied to the Media Mark to further decrease the visibility of the Media Mark once embedded.

Selecting the Media in which to Embed the Media Mark

As discussed above, Media Marks in accordance with embodiments of the invention are repeatedly embedded in the media. Spreading a Media Mark over time can increase the robustness of the Media Mark, because the uncovering process involves accumulating results from several portions of the media over time. Although the Media Mark generally cannot be recovered from a single portion of the media, each portion of the media contributes to the total detection result. When processing highly degraded media, the Media Mark can often be uncovered (even if the Media Mark has been significantly weakened in individual portions of the media) by using a longer period of the media and processing more individual portions of the media. In many embodiments, distributing the Media Mark throughout the media involves electing portions of the media in which to embed the Media Mark at periodic intervals. In other embodiments, the portions of media in which to embed the Media Mark are chosen based on the characteristics of the portion of the media. For example, the Media Mark may only be embedded in portions of the media that are unlikely to result in the presence of the Media Mark being observable.

Figure 9:
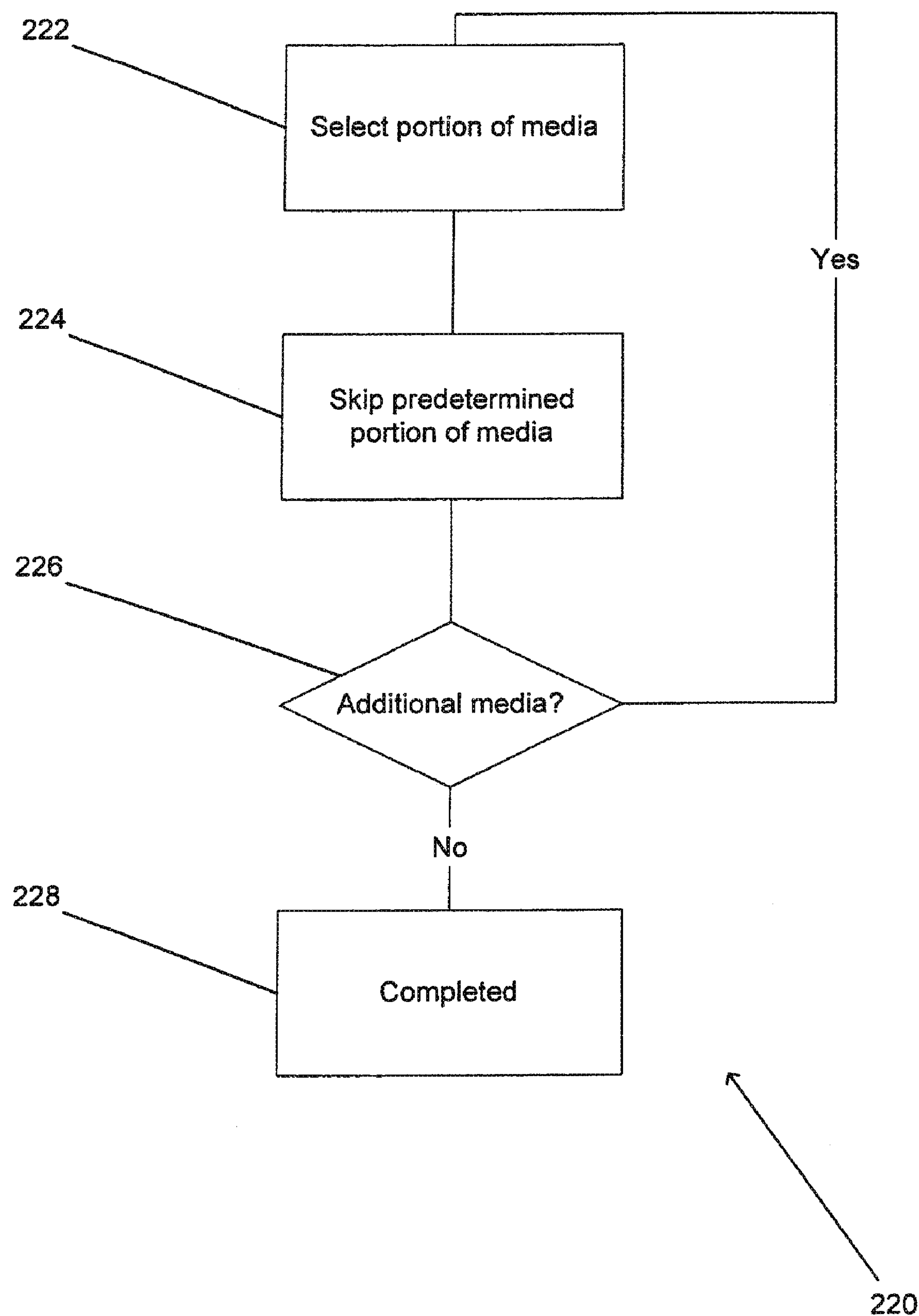
FIG. 9 is a flow chart showing a process for selecting predetermined portions of media in which to embed a Media Mark in accordance with an embodiment of the invention.

A process for selecting portions of media in which to embed a Media Mark in accordance with an embodiment of the present invention is shown in FIG. 9. The process 220 includes selecting (222) a first portion of the media, skipping (224) a predetermined portion of the media, determining (226) whether additional media remains and selecting (222) another portion of the media until no additional media remains. At which point, the process is complete (228).

In embodiments of the above process where the process is used to select frames from a video sequence, the Media Mark can be embedded in every frame of the digital video, every N frames of the digital video, or in random, multiple frames of the digital video. In many embodiments, a first portion of the Media Mark is embedded in every N frames, and a second portion of the Media Mark is embedded in every M frames of the digital video. Embedding different portions of a Media Mark repeatedly throughout the media can increase the difficulty of locating a Media Mark and the complexity of removing a Media Mark from the media.

Figure 10:
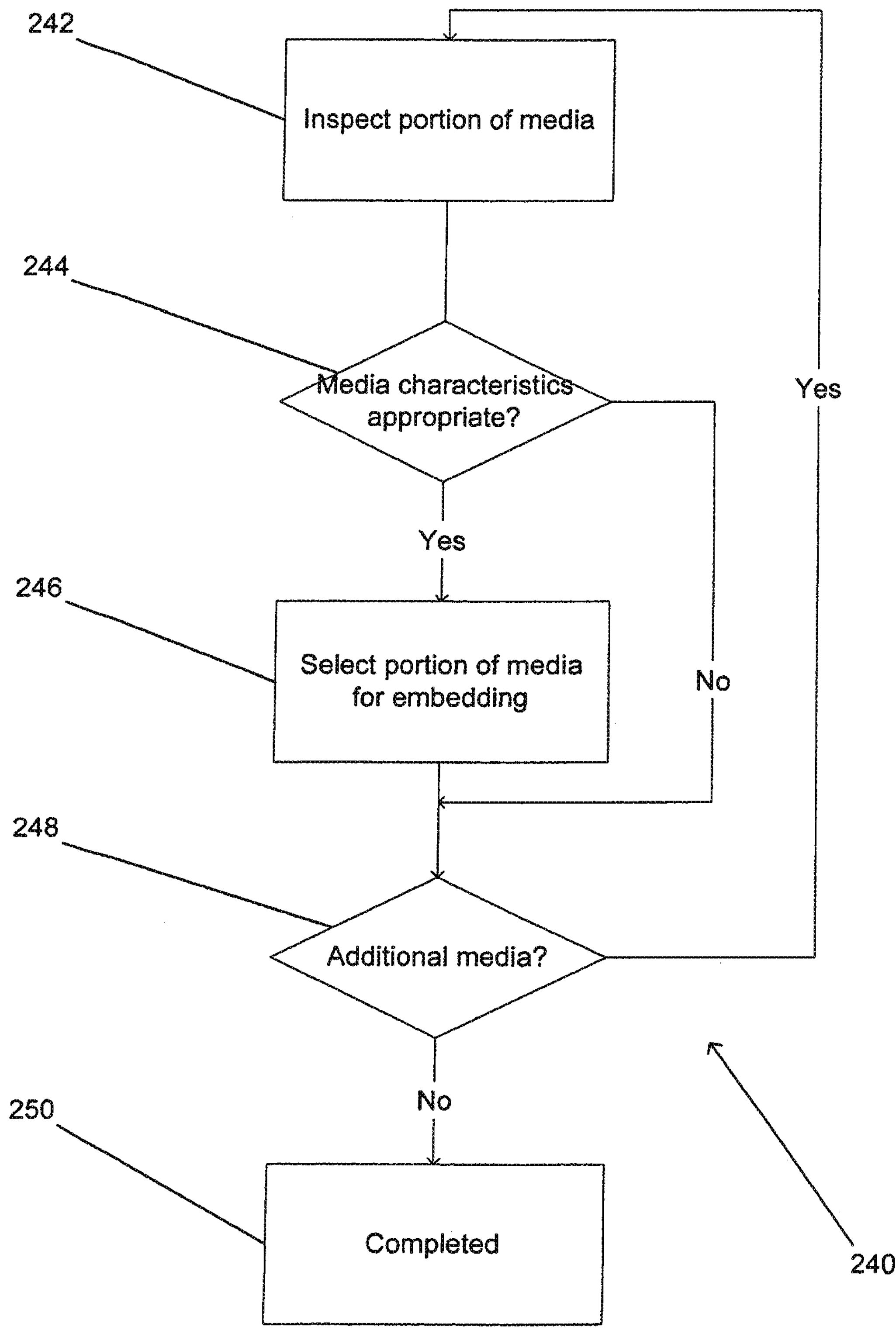
FIG. 10 is a flow chart showing a process for selecting portions of media in which to embed a Media Mark according to the media content, in accordance with another embodiment of the invention.

Another process for selecting a portion of media in which to embed a Media Mark is shown in FIG. 10. The process 240 includes inspecting (242) a portion of the media to determine (244) whether the portion of the media has characteristics that appropriate for embedding (246) a Media Mark in accordance with a set of criteria. For example, the criteria can include the level of variation and/or background noise in the media. A Media Mark is unlikely to be detected when embedded within a portion of media including high levels of variation and/or background noise. If the characteristics of the portion of media are determined to be appropriate, then the portion of media is selected (246) for embedding of a Media Mark. The process determines (248) whether additional media remains. If there is additional media, then the characteristics of the next portion are inspected (242). Once all of the media has been inspected, the process is complete (250).

In many embodiments, a combination of the above processes can be used to select portions of media in which to embed a Media Mark. In addition, other processes can be used in accordance with embodiments of the present invention to determine the portions of media in which to embed a Media Mark.

Combining a Media Mark and Media

A variety of techniques can be used to combine a Media Mark with media in accordance with embodiments of the present invention. The nature of the process typically depends upon the nature of the media and any invisibility, performance, and format requirements specified in a particular application.

As discussed above, the nature of the media influences the process used to combine a Media Mark and media. The media can be compressed or uncompressed and Media Marks in accordance with embodiments of the present invention can be combined with either compressed or uncompressed media information.

Figure 11:
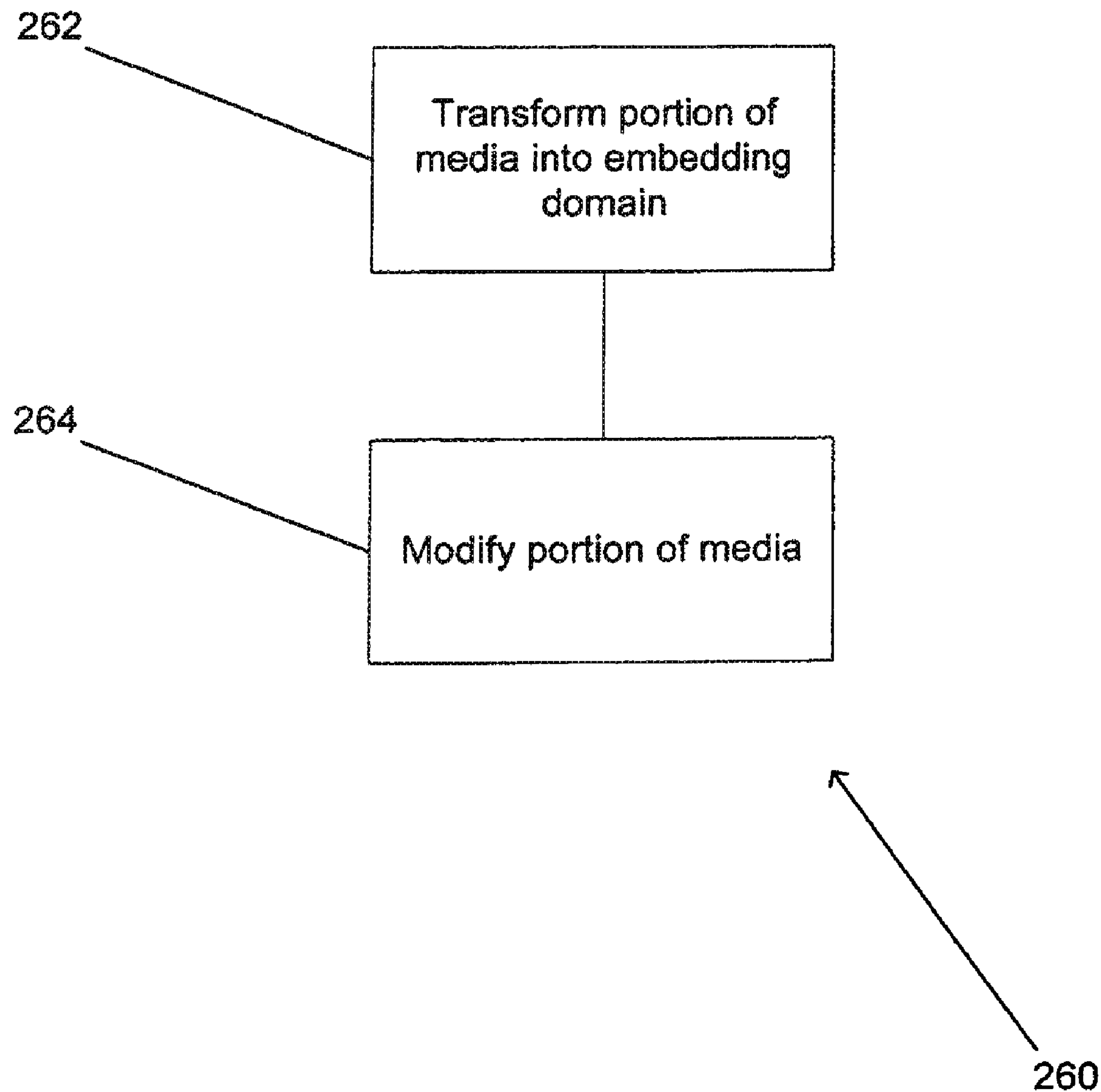
FIG. 11 is a flow chart showing a process for combining a Media Mark and a portion of media in accordance with an embodiment of the invention.

A process for combining Media Marks with media in accordance with an embodiment of the present invention is shown in FIG. 11. The process 260 includes transforming (262) the original portion of media into the embedding domain (if required). Once in the embedding domain, the information forming the original portion of the media is modified (264) to include the information of the Media Mark. The modifications are typically not noticeable in a single portion of the media. The distribution of weak modifications in selected locations over several portions of media makes use of the spatial and time domain and results in a three-dimensional (i.e., height, width, and time) mark being embedded in the media.

The above discussion refers to the embedding domain. The embedding domain is the nature of the information in which the Media Mark can be embedded. For example, the embedding domain for a frame of video or image can be a spatial or frequency domain. In many embodiments where the portions of media are frames of video, the embedding domain is the uncompressed spatial domain.

The modification of a portion of media in accordance with embodiments of the present invention can be performed in any of a variety of ways appropriate to the embedding domain of the portions of media in which the Media Mark is to be embedded. In many embodiments that combine a Media Mark with a frame of video or image, the combination is an addition of the Media Mark to the luminance component of the original video frame pixel by pixel. From the Media Mark, rendered onto a medium gray level background, the value of medium gray is subtracted so that medium gray values do not modify the frames and the graphic to be embedded is composed of positive and negative numbers. Only those lighter and darker areas of the rendered Media Mark introduce modifications to the portion of media.

Figure 12:
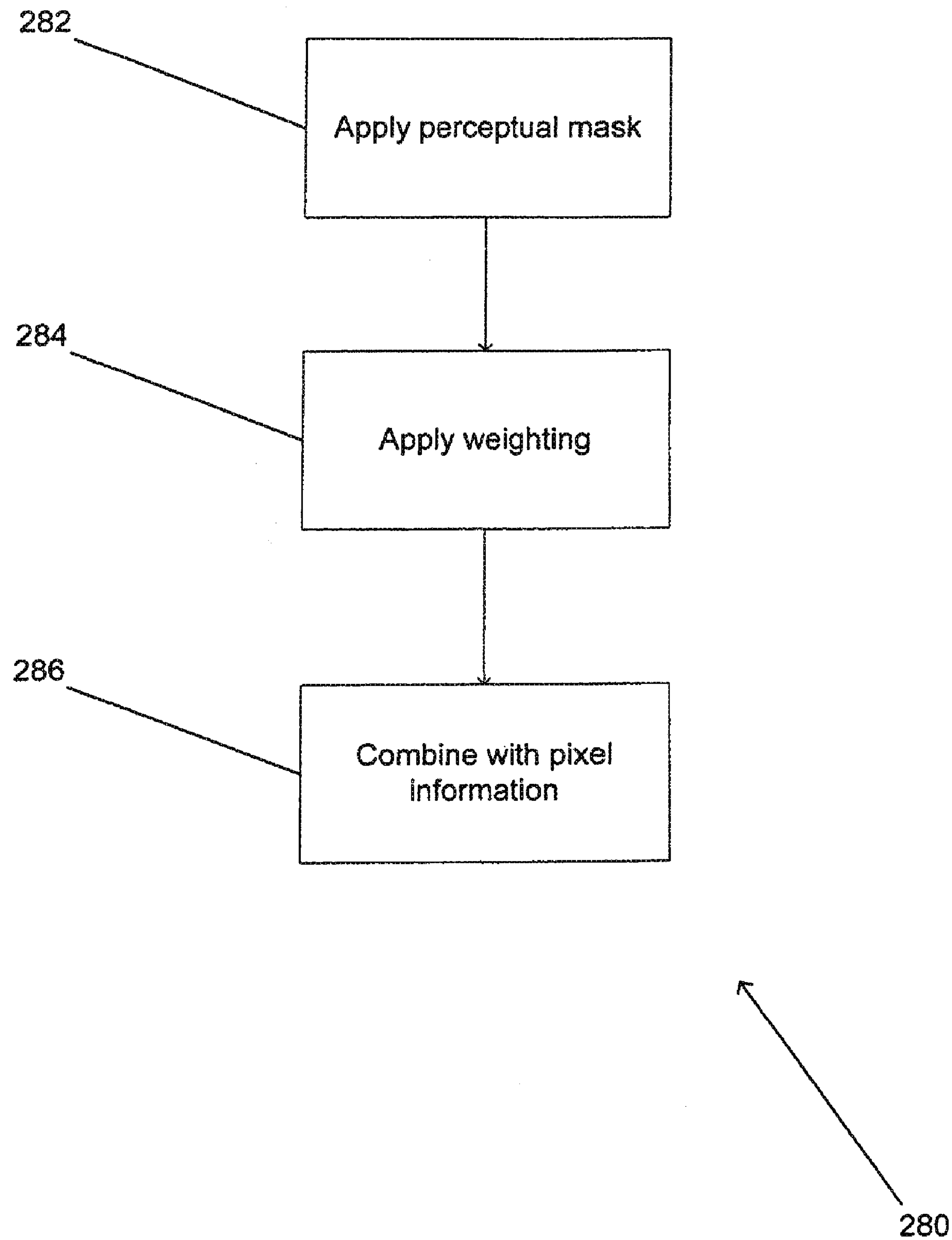
FIG. 12 is a flow chart showing a process for modifying a portion of media to include information from a Media Mark using a perceptual model in accordance with an embodiment of the invention.

A process for modifying a portion of a video frame in accordance with an embodiment of the invention is shown in FIG. 12. The process 280 includes applying a perceptual mask to the Media Mark, applying (284) a weighting representing an embedding strength to the Media Mark and then combining (286) the masked and weighted Media Mark with the pixels of the video frame or image. The above process refers to use of a perceptual mask. Perceptual masks are used to restrict the alterations of portions of media to regions where the alternations are unlikely to be apparent to an observer. Perceptual masks are discussed in greater detail below.

In many embodiments, the combination of the masked and weighted Media Mark with the pixels of the video frame or image is performed in accordance with the following formula:

$$S_{x,y,f}=O_{x,y,f}+(C_{x,y}-(V/2))*M_{x,y,f}*R,$$

Where:

- $S_{x,y,f}$ is the pixel at position x,y in frame number f of the marked video. S is limited to be within the allowed pixel value range;
- $O_{x,y,f}$ is the pixel at position x,y in frame number f of the original unmarked video;
- $C_{x,y}$ is the pixel at position x,y of the rendered Media Mark image;
- V/2 is the medium gray value;
- $M_{x,y,f}$ is the result of the calculation of the perceptual model at position x,y in frame number f;
- R is the robustness value that determines how strong modifications are applied to the video frame or image and, consequently, how visible they might become and how strong the Media Mark will be against modifications to the content. A higher value of R will embed a mark that might be more visible but that is also more resistant to modifications in that it can be detected sooner in a lower quality version of the Media Marked video. In the preferred embodiment, R has a value of 1.

In other embodiments, the Media Mark is subtracted from the video and in a number of embodiments, only the background is marked (i.e., the area of the Media Mark that does not contain information) resulting in a negative image being embedded. In some embodiments, the Media Mark is encoded as a difference between similar frames. Similarity is measured with a threshold value. This threshold value can be fixed or dynamically determined from the video, for example, such that 5% of the frames are in a group that has at least one other similar frame. At encoding time, differences are introduced between frames that are similar to each other. The Media Mark is coded by introducing differences between the frames in the areas covered by the Media Mark. These areas may be chosen according to visibility considerations or security considerations.

As discussed above, many embodiments of the invention modify video frames or images in a domain other than luminance. In a number of embodiments, individual or several color component values are modified. The color components can be derived from a color space such as lab, RGB, YUV, HSL, and CMYK. The choice of the embedding domain can be determined by the processing power to convert the carrier media into that processing domain. This is in particular relevant for applications where efficient application of the mark is required such as embedding during playback or download. If the media is uncompressed for playback, the uncompressed domain can be used and if the luminance domain is available e.g., in a YUV pixel format, the luminance, uncompressed pixel domain can be used to apply the mark. If the video is available in the compressed domain, e.g., during download, the mark can be applied in the compressed domain as described further below.

Perceptual Model

The above discussion of combining Media Marks and portions of media refers to the application of a perceptual mask. A perceptual mask is typically generated using a perceptual model to analyze the portion of media and identify where alterations to the portion of media would be less appreciable to a human observer. Perceptual models in accordance with embodiments of the present invention typically generate a mask that is combined with a Media Mark in such a way that the alterations to a portion of media created by combination with the masked Media Mark are comparatively greater in regions where the ability of a human to perceive the changes to the portion of media is reduced. In many embodiments, the perceptual mask defines the maximum imperceptible modification that can be made, when performing an alteration of a portion of media.

Properties of the human visual system are taken into consideration when a perceptual mask is created for combining a Media Mark and a video frame or image. The properties of the human visual system define a human's ability to see modifications to a video frame or image (i.e., the embedded information of the Media Mark) in view of the properties of an area's local and temporal neighborhood. Such properties include brightness, contrast, noise, color, and the changes in these properties that occur in time and space. For example, modifications to the frame are less perceptible in areas that are very dark or very light, areas that contain contrast, areas that are different from a previous or subsequent frame, such as scene changes, and areas that contain a large amount of high frequency information. Perceptual models in accordance with embodiments of the present invention can also take into consideration the device on which the video will be displayed to accommodate different perceptions of video depending on the display device used.

A process for generating a perceptual mask that indicates the amount of allowed modification for each pixel in a video frame or image in accordance with an embodiment of the present invention is discussed below. In the following equations, $P_{x,y,f}$ represents the pixel value of the luminance at position x, y in the frame number f. V is the maximum value for this pixel value. In addition, M is the weighted sum of imperceptibility values $M\mathbf{1}_{x,y,f}$, $M\mathbf{2}_{x,y,f}$, and $M\mathbf{3}_{x,y,f}$, which result from the analysis of several distinct perceptual properties described below. In other embodiments M can be formed as a function of the same or other imperceptibility values.

$M\mathbf{1}_{x,y,f}$ is a measure of the Spatial Contrast Masking for $P_{x,y,f}$ and is the contrast for that pixel, measured as the average of the absolute difference between $P_{x,y,f}$ and the neighboring pixels. The following formula defines this calculation for an area of 3×3 pixels, which is suited for a frame size of 640×480 pixels:

$$M1_{x,y,f} = \frac{\begin{pmatrix} |P_{x,y,f} - P_{x-1,y-1,f}| + |P_{x,y,f} - P_{x,-y-1,f}| + \\ |Px_{,y,f} - P_{x+1,y-1,f}| + |P_{x,y,f} - P_{x-1,y,f}| + \\ |P_{x,-y,f} - P_{x+1,y,f}| + |P_{x,y,f} - P_{x-1,y+1,f}| + \\ |P_{x,y,f} - P_{x,y+1,-f}| + |P_{x,y,f} - P_{x+1,y+1,f}| \end{pmatrix}}{8}$$

The above formula for $M\mathbf{1}_{x,y,f}$ can be easily adapted for pixel areas corresponding to a frame size exceeding 640×480 or a frame size below 640×480 by increasing the number of calculations and using a bigger radius for larger frame sizes.

$M\mathbf{2}_{x,y,f}$ is the Brightness of $P_{x,y,f}$ and has a higher value for very dark and very light areas, as determined by the following equation.

$$M2=|P_{x,y,f}-V/2|,$$

where V/2 is medium gray.

$M\mathbf{3}_{x,y,f}$ is the Temporal Contrast Masking and is the absolute difference between $P_{x,y,f}$ and the pixel in the same position of the previous frame, i.e., $M\mathbf{3}_{x,y,f}=|P_{x,y,f-1}-P_{x,y,f}|$.

As part of the process, the imperceptibility values M1 to M3 are normalized to have values ranging from 0 to 1. M1 to M3 can further be limited to maximum values to avoid extreme values for specific or unusual frame content.

The weighted sum of imperceptibility values is determined by the equation:

$$M_{x,y,f}=(W1*M1_{x,y,f}+W2*M2_{x,y,f}+W3*M3_{x,y,f})/(-W1+W2+W3)$$

Where

W1 is the weight for M1

W2 is the weight for M2, and

W3 is the weight for M3.

The weights W1, W2, W3 determine the impact of a perceptual property on the perceptual mask and can be refined according to visibility tests, or video content. In the preferred embodiment M1 and M3 have a weight of 1, and M2 has a weight of 0.5.

The above discussion describes the creation of perceptual masks with respect to the spatial domain. In many embodiments, when compressed content is marked, information used for compression is used for the perceptual model. Popular compression components used in MPEG1 and MPEG2 include motion vectors, which indicate re-use of frame content of preceding frames in different locations. Motion vectors determine the amount of motion involved, which is an important property for a perceptual model. Frames with long motion vectors or missing motion vectors, typically possess very little similarity to the previous frame. The size of the compressed frame or a compressed area can also be an indication of the amount of noise or frequencies in the frame or area. If many frequencies are present, the frame contains a significant amount of information and can be marked without perceptual degradation. By using compression information to create a perceptual mask, valuable information about the image structure and characteristics is gained without time consuming analysis. The data can be used to perceptually shape the Media Mark before embedding and to dynamically adapt the strength of embedding in specific areas.

In several embodiments, the generation of a perceptual model for a video sequence or collection of images is performed once and applied to several individually marked copies of the video sequence or collection of images. The generated information can also be compressed, transmitted electronically, and applied at a later stage. For example, the perceptual model can be stored separately and applied during each playback of a video sequence or collection of images without modification of the stored media. The storage of a separate perceptual model can allow for a temporary mark that can be enabled, disabled, or modified in a flexible manner.

Figure 13:
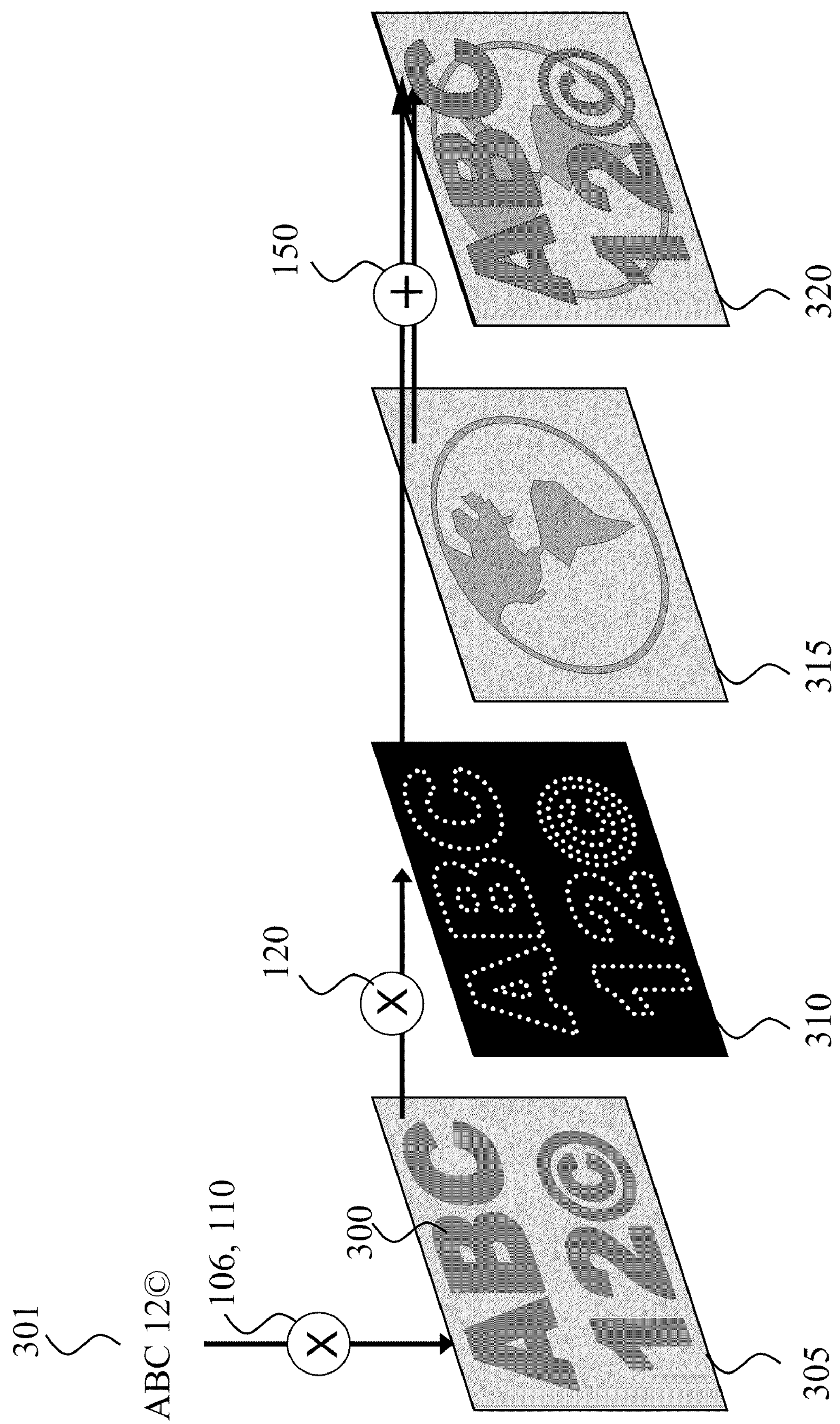
FIG. 13 is an illustrative example of an embedding process in which the Media Mark, including an identifying graphic with text "ABC 12.COPYRGT." is perceptually shaped and combined with a video frame showing a globe, according to still another embodiment of the invention.

An illustrative example of an embedding process in accordance with the present invention is shown in FIG. 13. A message "ABC 12.COPYRGT." 301, is encoded and rendered to form a Media Mark 305. During embedding, a perceptual mask 310 is created for the areas that are modified during embedding. The Media Mark 305 and a video frame, which is in this case of a globe 315, are combined according to the perceptual mask 310 to produce a frame with an embedded Media Mark 320.

In many embodiments, the Media Mark is embedded in a similar manner in similar frames because the perceptual model will give similar results for similar frames. The ability to generate similar results for similar frames can prevent the use of statistical analysis to determine the properties of the Media Mark by comparing the differences introduced in two visually similar frames. In addition, embedding a Media Mark in a similar manner in each frame increases the likelihood that the Media Mark will be present in any new video sequence created by averaging together frames of the video sequence in which the Media Mark is embedded, or by changing the order of frames of the video sequence.

In many embodiments, the perceptual model can be simplified and the amount and size of embedded symbols and pixels to be modified can be varied according to performance requirements. In addition, the original video can be divided into several sections and marked with different Media Marks to hide a larger amount of information.

Combining a Media Mark and Compressed Media

In several embodiments, the modification is performed by modifying compressed elements. The analysis of the perceptual model as well as the actual combining can be performed in popular compression domains such as DCT, Wavelet, and Fast Fourier. The Media Mark, as well as the frame, is represented and combined in the particular domain. For the DCT domain, which is used in MPEG1, MPEG2 and MPEG4, spatial contrast measure M1 is the absolute sum of all DCT components of the block containing $P_{x,y,f}$, brightness measure M2 is derived from the value of the DC component, and temporal contrast measure M3 is the sum of the absolute difference between frequencies in the current and the previous frame. The combination of the Media Mark with the DCT compressed frame is the addition of the corresponding DCT coefficients and can be calculated as follows: Marked Frame DCT component=Original Video DCT component+(Media Mark DCT component-Medium Gray Value DCT component)*M*R.

In another embodiment, the Media Mark is embedded in different domains such as Wavelet, or Fast Fourier domain. When combining a Media Mark with a portion of media in a transformed domain, the Media Mark can be human recognizable in the transformed domain or spatial domain. For example, the spatial representation of the mark can be embedded in the transformed domain of the original video (the uncovered Media Mark is recognizable in a transformed domain, an image that is visible when looked at in the fast Fourier converted image) or the transformed representation of the mark is embedded in the transformed domain of the original video. The embedding of spatial information in a transformed domain can result in artifacts, which are not recognizable as human readable symbols but rather as noise.

In a number of embodiments, information is embedded in multiple embedding domains. Placing information in multiple domains can decrease the likelihood that manipulation of the media in which the Media Marks are embedded will result in elimination of all Media Mark information. Different domains can also serve as carriers for different information that is embedded independently of each user, such as to secure several independent marks that are applied at different locations and times in the same content.

Modification of Embedding Positions

In another embodiment, the embedding positions are secured with a cryptographic process to prevent unauthorized removal of the Media Mark. The process involves varying the embedding locations according to a key or key sequence. This key sequence can be generated pseudo randomly in time intervals or it can be generated from the payload to be embedded or it can be supplied by the user. In some embodiments of the invention variations are applied within each frame and same locations of a frame are used to embed a stronger mark than others. These variations differ for every frame and for identical frames in different movies. The variations prevent the perfect inversion of the embedding process without the knowledge of the key. This key is asymmetric because it is not required for uncovering or recognition of the Media Mark. The key is only required for embedding and removing the Media Mark. It can be discarded after embedding if removal is not required.

In other embodiments of the invention, another key or key sequence is used to apply variations to a frame sequence by changing the position of the graphic in the frame. This key sequence can be generated pseudo randomly in time intervals or it can be generated from the payload to be embedded or it can be supplied by the user. Depending on the key sequence, different frame sequences will contain the graphic in a different position and intervals of the resulting movie will contain different marks. The security is enhanced since an attempt to remove content typically applies to the entire movie and while it might affect one interval the mark might not be significantly affected in other intervals. This key sequence can be stored for uncovering, as it can be helpful during uncovering to identify the frame sequences with identical positions of the Media Mark.

Embedding Media Marks in Audio

While many of the embodiments outlined above describe the application of a Media Mark to video, audio Media Marks can be added to audio in a manner similar to that described for video. The Media Mark is a short audio, composed of signal tones or spoken words or digits. The Media Mark (audio mark) is repeatedly embedded to the media content in a weak, inaudible manner. In one embodiment, the audio mark is perceptually shaped, applying a stronger mark where the modification is less audible. These are periods where many other audible frequencies are present. The uncovering is performed by applying a high-pass filter to the audio and averaging subsections of the length of the short audio mark.

In many embodiments embodiment, the audio Media Mark is S seconds in length, is perceptually shaped and added repeatedly to the audio. During detection, the digital audio is split into sections of S seconds in length. The sections are processed with a high pass filter and averaged until the hidden sound becomes audible to humans.

Embedding Media Marks in Video Using Lenses

Figure 13A:
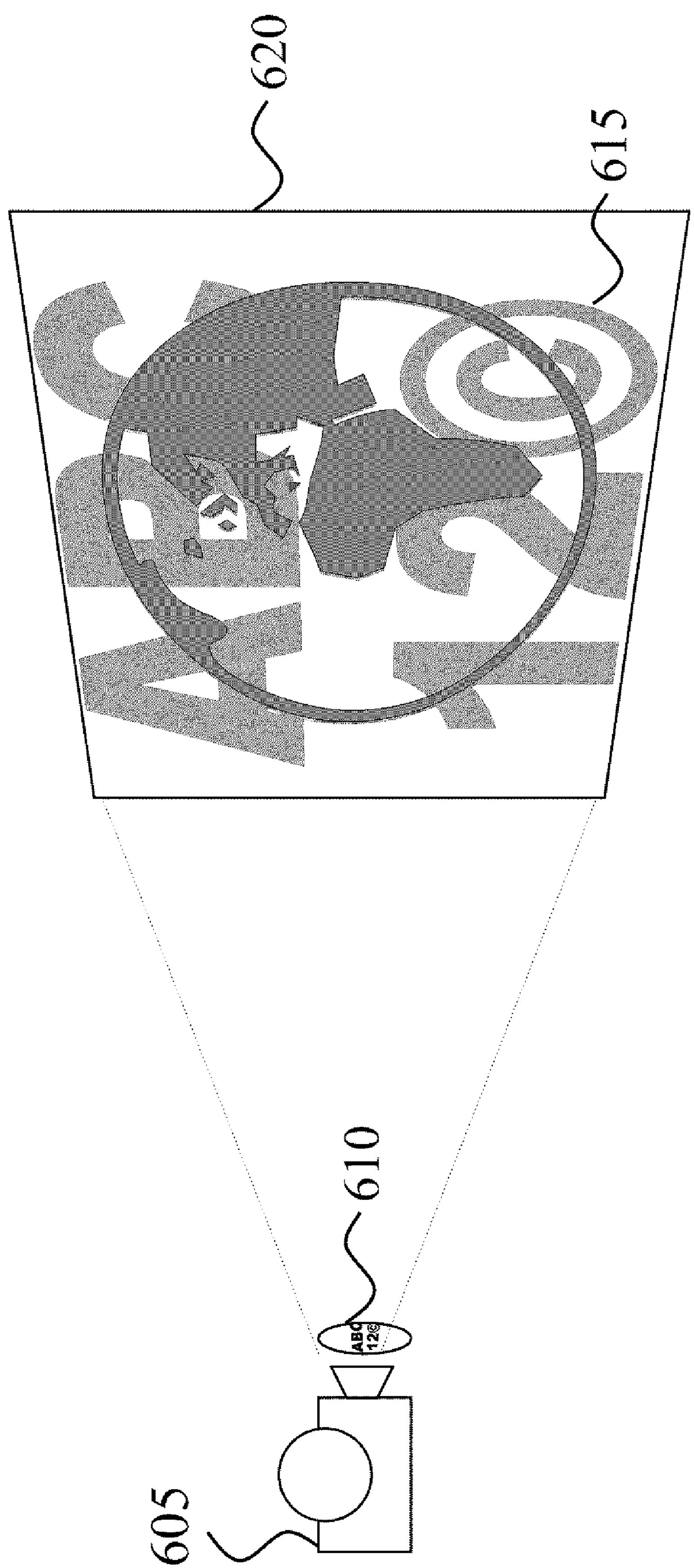
FIG. 13A is an illustrative example of an application of a Media Mark with a lens during projection or recording of an analog video, according to still another embodiment of the invention.

Embodiments of the invention can use analog techniques in addition to digital techniques to embed Media Marks in media. An embodiment of a system that can embed Media Marks in video sequences using a lens in accordance with an embodiment of the invention is shown in FIG. 13A. The system embeds a Media Mark in analog video using a lens 610 with a video projector 605 or recorder. The lens 610 is used to embed a mark during projection, or recording of video. The lens 610 includes one or more semi-transparent characters 615. The characters 615 function as the Media Mark and represent identification information for the video. When the video is projected through this lens, the identification information is overlaid on the displayed video and the characters are slightly superimposed to the projected video and therefore create a modification to the projected video that is similar to the digital process disclosed in this invention. The transparency of these characters is adjusted to be weak enough such that they are typically imperceptible on the projected image (shown in FIG. 13A for demonstration purposes) and yet strong enough to slightly change the projected video. These changes can than typically be uncovered with the procedure disclosed in this invention from a digital version of re-recorded content. In another embodiment, the lens is securely fixed to the projector or sealed with a tamper evident seal. This application is useful to hide cinema identification information in the projected video and to protect motion picture content at recording time. In another embodiment, the embedding of a Media Mark is performed with a camera lens and is used to identify the camera used for recording.

Uncovering Media Marks

Uncovering a Media Mark embedded in media in accordance with embodiments of the present invention typically involves use of a process designed to emphasize the subtle differences between portions of the media in which the Media Mark is embedded. Emphasizing the differences results in emphasis being placed on the subtle alterations of the media introduced by the embedding process. By accumulating results over several intervals of the media, the differences can be displayed for recognition. In many embodiments, the recognition and interpretation of the extracted Media Mark is performed by a human. Human perceptual capabilities are often highly suited to recognition of degraded images or audio. In a number of embodiments, the Media Mark is uncovered by combining information from multiple portions of the media and inspection is performed as the information is combined. The ability to use multiple portions from different parts of the media means that no synchronization of the media is required to uncover the Media Mark. When inspection is performed concurrently with the combination of information, the user can halt the combination process when the Media Mark has been uncovered with sufficient clarity. In other embodiments, all portions of the media are combined or a predetermined portion of the media can be combined and then inspection is performed.

Figure 14:
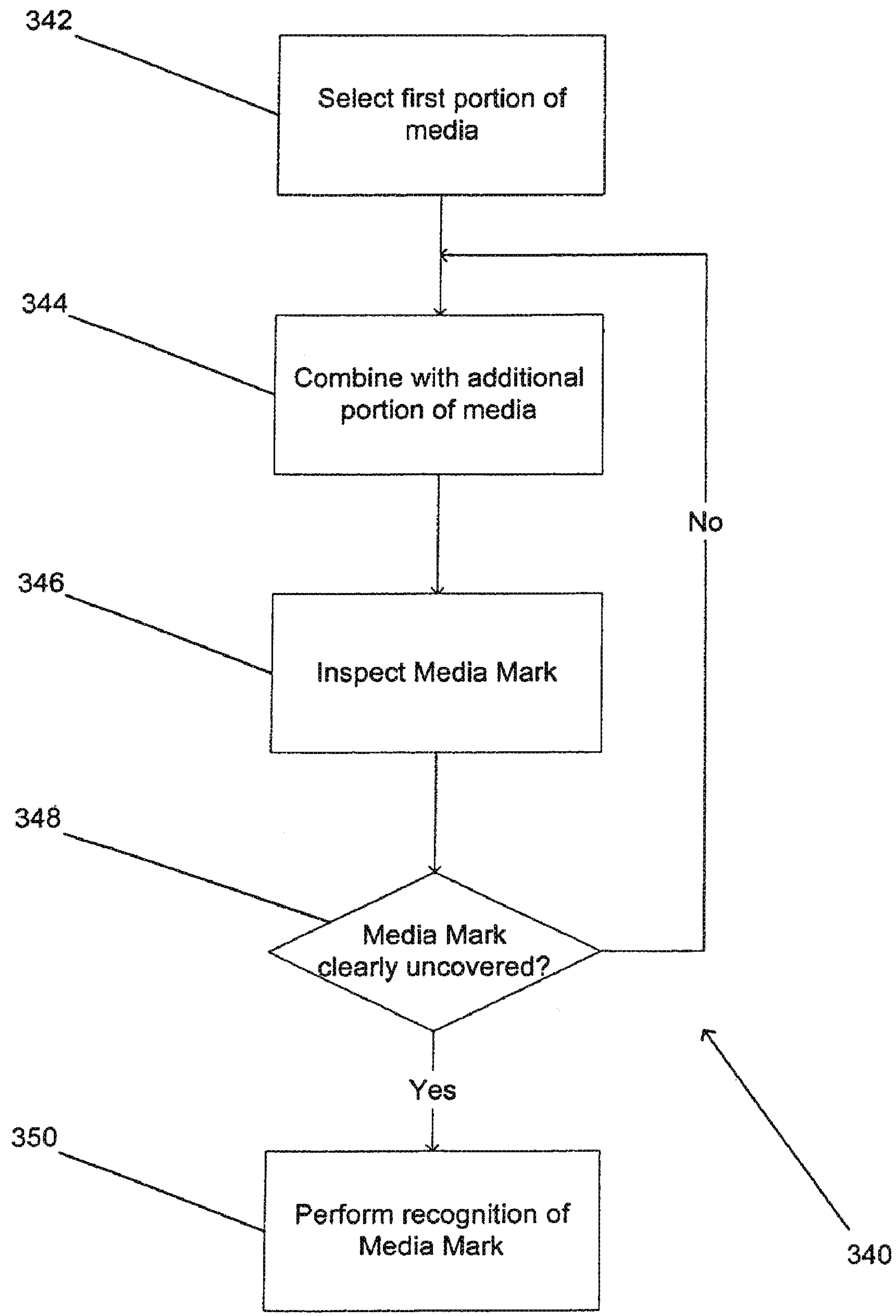
FIG. 14 is a flow chart showing a process for uncovering a Media Mark in accordance with an embodiment of the invention.

A process for uncovering, recognizing and interpreting a Media Mark embedded in media in accordance with an embodiment of the invention is shown in FIG. 14. The process 340 includes selecting a first portion of the media (342) and combining information from an additional portion of the media with the first portion to emphasize the Media Mark. The combined information is then inspected (346) and a decision made (348) concerning whether the Media Mark has been uncovered with sufficient clarity to perform recognition. When the Media Mark is not sufficiently uncovered, information from an additional portion of the media is combined (344) with the previously combined information until the Media Mark is uncovered. Once the Media Mark is uncovered, recognition (350) can be performed.

In many embodiments, combining information from portions of media to emphasize a Media Mark involves a high pass filter. This can be implemented by processing each pixel of each frame by assigning it a value corresponding to a histogram stretch on an N×N pixel area (e.g., 9×9), surrounding the pixel. This operation is a specific version of a high pass filter. In some embodiments the uncovering process is applied independently of a key and processes the all locations of the video only according to its content. In other embodiments, the media is processed in intervals defined by a key as described above. In many embodiments, other processing such as application of contrast enhancement, unsharpen masks, histograms functions like histogram stretch, auto to levels and filtering with such filters as sobel filters or other edge detection filters are used to emphasize a Media Mark. In several embodiments, multiple frames are averaged and then a filtering process is applied. In other embodiments, multiple frames are filtered and then the filtered frames are averaged to emphasize the Media Mark.

Figure 15:
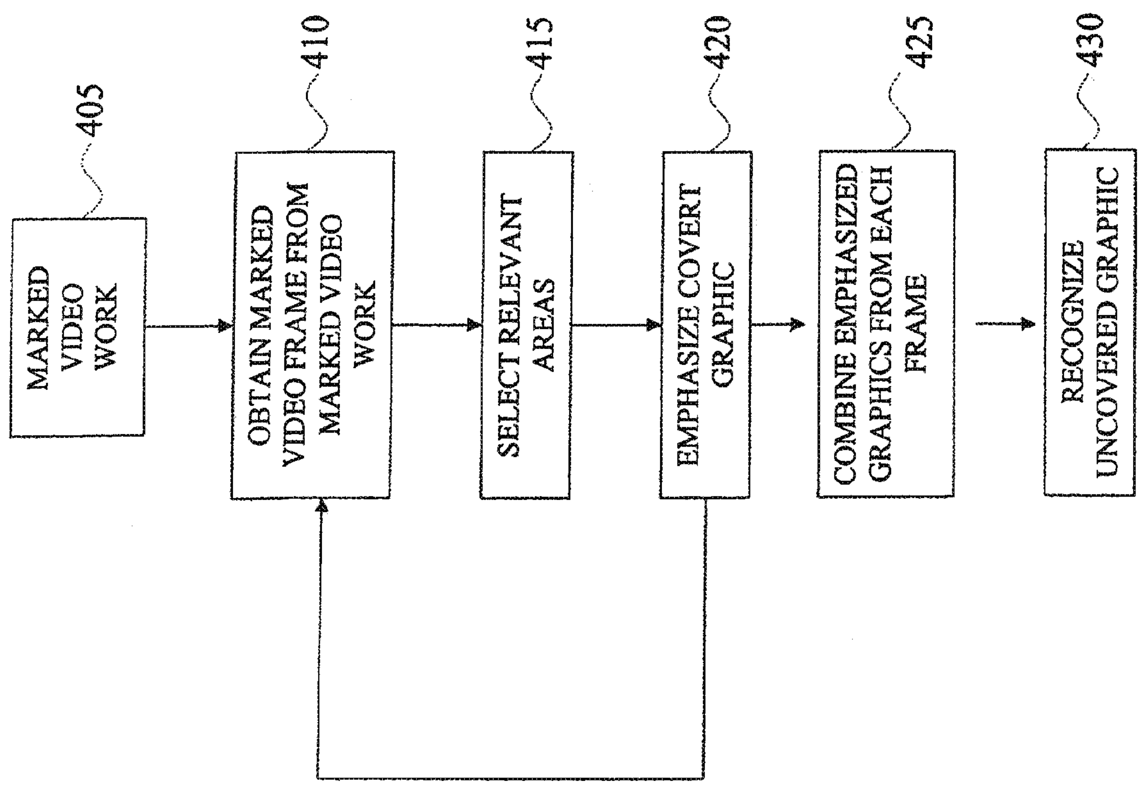
FIG. 15 is a flow diagram of a process for uncovering a Media Mark by accumulating results in accordance with an embodiment of the invention.

A process for uncovering a Media Mark embedded in a video sequence in accordance with an embodiment of the invention is shown in FIG. 15. As discussed above, the uncover process involves highlighting subtle information that is common to different portions of the media. In the illustrated embodiment, the uncovering process is applied to a marked video that potentially has undergone some transformations, such as re-recording, re-encoding, or filtering.

First, a video sequence that may include a Media Mark, is selected (405) for the uncovering process. A frame of the video is obtained (410) from the video sequence. If necessary, the frame is transformed to the detection domain. In some embodiments, the detection domain is uncompressed. From this frame, relevant areas of pixels that are suited to highlight the Media Mark are selected (415). Depending on the degradation the video has undergone since the embedding of the Media Mark, the alterations due to the Media Mark can be stronger in some areas of each frame and are, therefore, more relevant for uncovering the Media Mark. These relevant areas can include areas of pixels that have differences compared to the previous frame, areas of pixels that include a significant amount of low frequency information, or areas of pixels that are generally suited for uncovering a Media Mark. Subtle differences within the areas of pixels are then emphasized (420).

The uncovered frames can then be combined (425) and the result presented to a human observer for detection (430). In some embodiments, the result can then be used to look up a database entry, stop a machine from recording, or notify the owner or original recipient that the video is an illegal copy.

In many embodiments, the process of emphasizing subtle differences involves application of the following process for each pixel $P_{x,y,f}$ at each position x,y, for each frame f in each color domain (such as red, green, and blue). The process involves application of an N×N high pass filter (see discussion above):

A. Select an area $G_{x,y,f}$. This is the area around the pixel $P_{x,y,f}$. In this example, the size of $G_{x,y,f}$ is a 9×9 pixel area and in this case is defined by the pixel position of the four corners: (x−4, y−4), (x+4, y−4), (x−4, y+4), (x+4, y+4). The size, width and height of the area can vary depending on the alteration applied to the video and/or the frame resolution.

B. Emphasize differences between the pixels in area $G_{x,y,f}$ by calculating a histogram stretch on area $G_{x,y,f}$. Then, a value $Lp'_{x,y,f}$ (the result of the histogram stretch) is stored at the position of pixel $P_{x,y,f}$ according to the formula described below:

$$Lp'_{x,y,f}=(P_{x,y,f}-L\min_{x,y,f})*V/(L\max_{x,y,f}-L\min_{x,y,f}).$$

Where, $L\min_{x,y,f}$=smallest value of any pixel in area $G_{x,y,f}$;

$L\max_{x,y,f}$=highest value of any pixel in area $G_{x,y,f}$; and

Lp'x,y,f=the result of this histogram stretch for pixel $P_{x,y,f}$.

V=maximum pixel value, minimum pixel value is 0.

C. Average the processed frames for each pixel at each position (x,y), by determining a corresponding pixel $E_{x,y}$ at position x,y of the uncovered Media Mark as an average of Lp' over all frames, as shown in the following equation.

$$E_{x,y}=\frac{\sum_{f=1}^{N_f} Lp'_{x,y,f}}{N_f}$$

Where,

Nf=total number of marked frames used for the uncover process.

$E_{x,y}$=Pixel of the uncovered Media Mark at position x,y.

In several embodiments, step B of the above algorithm includes contrast enhancement, unsharpen masks, high pass filters, histogram stretch, histogram equalization, and edge detection, such as implemented by edge detection filters. The best results can vary depending on video content and degradation. Results from different uncover approaches can be analyzed by a human operator in order to choose the best result for recognition in any given application.

In a number of embodiments, detection is performed using compressed components directly, such as DC coefficients in DCT compressed frames instead of pixels, for example. When using DCT compressed video like MPEG1, MPEG2, or H.264, DCT blocks can be taken as areas to be analyzed. Alternatively, DC components, instead of individual pixels, can be analyzed if the video sequence has a sufficiently high resolution (e.g., 640×480 pixels).

Although the original video sequence is not required to uncover a Media Mark in accordance with an embodiment of the present invention, access to the original video can substantially improve the clarity of an uncovered Media Mark. The original video frame can be subtracted from the frame marked with the Media Mark prior to processing.

Figure 16:
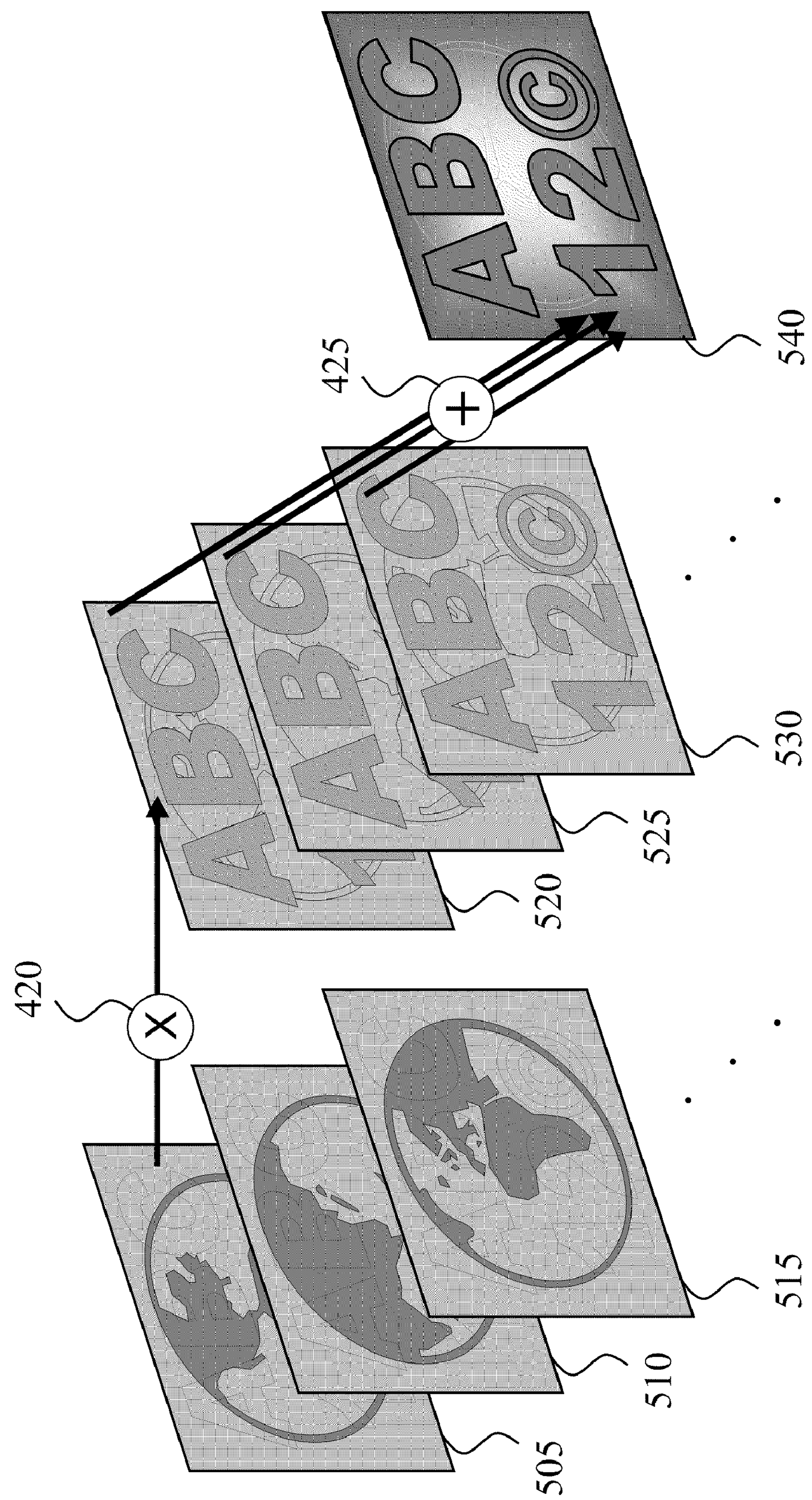
FIG. 16 is an illustrative example of an uncovering process for uncovering the Media Mark by emphasizing data manipulations in several video frames and combining the result, according to another embodiment of the invention.

An illustrative example of an uncovering process applied to a video sequence in accordance with an embodiment of the invention is shown in FIG. 16. Three digital movie frames 505, 510, 515 are shown with an embedded Media Mark that is visible for demonstration purposes. Each video frame 505, 510, 515 is processed to emphasize the Media Mark, as is described above. This processing produces three modified frames 520, 525, 530 respectively. The modified frames 520, 525, 530 are combined, as is described above, to obtain the visible, human readable uncovered Media Mark 540.

When a Media Mark is uncovered in a video sequence or collection of images, the human visual system is typically capable of performing registration and can recognize characters despite any geometric distortion by transformations such as rotation, shifting, and stretching that have been applied to the video sequence or collection of images. Sources of geometric distortion can include geometric transformations introduced during processing of the video such as re-recording with a camcorder. Further, the uncovered Media Mark is still readable even if the video has had geometric transformations applied voluntarily to destroy a watermark or if the video is significantly degraded (e.g., by compression, transformation, color conversion, addition of noise, etc.).

Machine Recognition of Media Marks

In another embodiment, the Media Mark consists of computer readable information. After it is uncovered with the uncovering procedure, the uncovered Media Mark is interpreted by a machine to enable automated readout. The machine readable information can include machine readable elements such as either characters (OCR-Fonts like: OCR-A or OCR-B), barcodes (e.g., Linear barcodes, Stacked barcodes, 2D barcodes), or symbols that can be recognized by a computer. Examples for barcodes include the following symbologies: UPC, Interleaved 2 of 5, Code 39, Code 93, Code 128, EAN, Stacked barcodes symbology like: PDF417, 2D barcodes, also called matrix code, with symbology like: Aztec Code, Bullseye, DataGlyphs, Datamatrix, Dot Code. For recognition, barcode reading, pattern recognition, or optical character recognition is used.

Removing Media Marks

During the embedding process, only some of the video data is modified. However, all of the video data is used for uncovering. Consequently, the precise locations of the individual alterations cannot be observed by analyzing or reverse engineering the uncover process even if the uncovered Media Mark can be recognized. Therefore, the Media Mark is secured against unauthorized removal since the embedding positions and modifications have to be known for removal. The embedding process is, however, reversible if the Media Mark, the embedding parameters and all subsequent modifications are known. If removal of the Media Mark is required, the embedding process can be reversed, leaving the video as if it had never been marked. The process of removing the Media Mark essentially involves using knowledge of the embedding process to apply the embedding process in reverse.

DESCRIPTION OF APPLICATIONS

The systems and techniques described above can be used in a virtually limitless range of applications. The following are provided as a series of examples of applications in which systems and processes in accordance with embodiments of the invention can be useful.

Tracking Unauthorized Distribution of Secret or Copyrighted Information

A problem that faces many industries is the unauthorized distribution of information. Systems and processes in accordance with embodiments of the present invention can be used to embed Media Marks in media information at the time of reception or display of the media. Each distributed copy can be uniquely marked with information such as a recipient identification number and a time stamp and, if the copy is publicly available or in the possession of an entity or individual that is not authorized to possess the information, the information can be uncovered and the entity or person that is the recipient of the media and the likely source of the unauthorized distribution can be identified.

In many instances, the secret or copyrighted information is passed between several different entities and/or individuals during production and authorized distribution. In several embodiments, the point from which the information was distributed without authorization can be ascertained by embedding a Media Mark associated with the last recipient of the information prior to delivery. The entity or individual that is responsible for the unauthorized distribution can then be identified based upon the last Media Mark added to the media.

A common instance in which copyrighted information is distributed is the distribution of copyrighted media via a network to a media player. In many embodiments, the player is a consumer electronics device such as a set top box or a personal computer. The copyrighted media is typically distributed to the player in a compressed and encrypted form. After decryption, a Media Mark can be embedded in the media in accordance with embodiments of the invention. The Media Mark can contain information relating to the owner of the player and information identifying the time of transmission or playback. If the recipient of the information is known, the information to be embedded can be generated by the server (or head end) providing the media. The embedded information can also be stored by the server in a database that contains additional information about the transaction, such as the user's billing information and details about the receiving device. In other embodiments, the player maintains information such as player identification number and time, which is embedded as a Media Mark during storage and/or playback.

Another instance in which unauthorized distribution is a common problem is in the production of media. During production, content is particularly vulnerable to unauthorized distribution that can cause considerable damage to the producer of the media. In many embodiments, Media Marks are embedded in the media during various stages of production that identify the recipient of the media and the time of the receipt of the media. If the copy is made publicly available, the Media Mark can be uncovered and the responsible person or entity can be identified.

In many of the embodiments outlined above, a perceptual model is created for the distributed media and stored or distributed with the media. The perceptual model can then be used as Media Marks are embedded in the media. In other embodiments, a perceptual model is created every time a Media Mark is embedded in the media.

Proof of Ownership

Once media is subject to public distribution, proving ownership of copyright in the media can be problematic. In many embodiments, Media Marks are embedded in the media to prove ownership of the content. In a number of embodiments, the Media Mark includes ownership information or identification for copyrighted content. This mark can be automatically read and its presence or absence can be evaluated to restrict or allow distribution or to verify that a source distributing the media is a legitimate distributor of the media. It can also be used, so that entities or individuals interested in obtaining rights with respect to the content can identify the owner of the content by uncovering the embedded Media Mark. Another use for a Media Mark identifying the owner is to automatically identify content in publicly available database, e.g., accessible trough the internet for content owned by a specific owner or group of owners to prevent further distribution. Finally this mark can be used to prove ownership in case of a dispute.

Storing Robust Meta-Information

During long term storage and archival, information stored with media can be lost either because it is deleted accidentally or because it cannot be read. Many embodiments of the invention are configured to store information concerning media using Media Marks. Storing information using Media Marks can enable the information to be retrieved after format change and does not require additional storage space.

Copy Control

In many embodiments, a strong Media Mark that is machine readable can be embedded into media. The Media Mark can then be used by a player to control playback and/or recording of the media. The player can uncover the Media Mark and ascertain the authorizations required to play the media. If the player has the appropriate authorizations, then the player can play the media or refuse playback otherwise.

Broadcast Monitoring

Machine readable Media Marks in accordance with embodiments of the present invention can also be embedded in media broadcast by a television or radio station. The machine readable Media Marks can then be used by receiver devices to automatically record the content that was broadcast and to track the frequency and time of broadcast. The Media Mark embedded in the media can be distinct for each work and broadcast.

Secret Communication

As mentioned above, Media Marks can be used to transmit secret information using media. While the transmission of the media can be observed the fact that the media contain an additional Media Mark is not obvious and can be used to transmit information without allowing others to observe that information is transmitted other than the media content.

Identification of Publicly Displayed Media

Media that are publicly displayed are frequently the subject of rerecording. In many embodiments, a Media Mark is embedded in publicly displayed media that identifies the time and/or place of public display. Should the media be rerecorded during the public display, then the Media Mark is embedded in the unauthorized rerecording and uncovering this information can be helpful in preventing future rerecording of publicly displayed media at the venue in which the rerecording was made.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of imperceptibly embedding an image that includes human recognizable information in a video sequence, comprising:

rendering the image;

obtaining a plurality of video frames from the video sequence;

combining at least part of the rendered image with each of the plurality of video frames to form modified video frames, where the parts of the rendered image are embedded in the frequency domain of each of the plurality of video frames in such a way that the information in the rendered image is human recognizable in the frequency domain of the combination of the plurality of video frames, and the modifications to the plurality of video frames are not apparent to a human observer; and thereby creating a modified video sequence containing the human recognizable image, using the rendered image.

2. The method of claim 1, further comprising randomly varying the geometry of the rendered image.

3. The method of claim 1 wherein combining at least part of the rendered image with each of the plurality of video frames includes combining at least part of the rendered image with each video frame according to a perceptual. model.

4. The method of claim 1 wherein the portions of the rendered image combined with video frames are selected pseudo randomly.

5. The method of claim 1 wherein the information comprises metadata related to the video sequence.

6. The method of claim 1 wherein the information identifies the time and location of video playback.

7. The method of claim 1 wherein the information identifies the copyright owner or recipient of the media.

8. The method of claim 1 wherein the information includes a reference to a database.

9. A method of uncovering an image containing human recognizable information from a marked video sequence created by imperceptibly embedding the image across a plurality of frames of an original video sequence, comprising:

creating a plurality of difference frames by comparing a plurality of frames from the marked video sequence to the corresponding frames in the unmarked video sequence, where comparisons involving frames from the marked video sequence in which the human recognizable information is imperceptibly embedded result in difference frames that emphasize the human recognizable information imperceptibly embedded in the marked frames; and combining the difference frames in a predetermined manner to create a revealed image, where the combining of the difference frames in a predetermined manner proceeds until the human recognizable information in the revealed image is recognizable.

10. The method of claim 9, further comprising emphasizing the image containing human recognizable information in frames in which it is embedded by applying a high pass filter to each of the plurality of difference frames.

11. The method of claim 9 wherein combining the difference frames in a predetermined manner to create a revealed image comprises averaging together the difference frames.

12. The method of claim 9 wherein the image containing human recognizable information is recognized by a device as the combination of the difference frames creates a revealed image.

13. The method of claim 9, wherein the revealed image is in the spatial. domain of the combined difference frames.

14. The method of claim 9, wherein the revealed image is in the frequency domain of the combined difference frames.

15. The method of claim 14, wherein the frequency domain is the DCT domain.

16. The method of claim 14, wherein the frequency domain is the Fourier domain.

17. The method of claim 14, wherein the frequency domain is the Wavelet domain.

18. The method of claim 1, wherein the frequency domain is the DCT domain.

19. The method of claim 1, wherein the frequency domain is the Fourier domain.

20. The method of claim 1, wherein the frequency domain is the Wavelet domain.

* * * * *